(12) United States Patent
Lenhart et al.

(10) Patent No.: US 10,776,824 B2
(45) Date of Patent: Sep. 15, 2020

(54) SYSTEMS AND METHODS FOR RECOMMENDING ELECTRONIC DEVICES BASED ON USER PURCHASE HABITS

(71) Applicant: Rovi Guides, Inc., San Jose, CA (US)

(72) Inventors: Kevin Bruce Lenhart, Campbell, CA (US); Paul Stathacopoulos, San Carlos, CA (US); Sean Matthews, Los Altos, CA (US); Benjamin Holms Maughan, Pleasanton, CA (US)

(73) Assignee: ROVI GUIDES, INC., San Jose, CA (US)

( * ) Notice: Subject to any disclaimer, the term of this patent is extended or adjusted under 35 U.S.C. 154(b) by 589 days.

(21) Appl. No.: 15/397,526

(22) Filed: Jan. 3, 2017

(65) Prior Publication Data

US 2018/0189830 A1 Jul. 5, 2018

(51) Int. Cl.
*G06Q 10/00* (2012.01)
*G06Q 30/02* (2012.01)

(52) U.S. Cl.
CPC .................. *G06Q 30/0255* (2013.01)

(58) Field of Classification Search
CPC combination set(s) only.
See application file for complete search history.

(56) References Cited

U.S. PATENT DOCUMENTS

| 6,239,794 | B1 | 5/2001 | Yuen et al. |
|---|---|---|---|
| 6,388,714 | B1 | 5/2002 | Schein et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,484,099 | B1 * | 7/2013 | Pope .................... G06Q 30/016 705/26.7 |
| 9,420,319 | B1 * | 8/2016 | Story, Jr. ............ G06Q 30/0631 |
| 9,959,563 | B1 | 5/2018 | Wu |
| 2002/0065721 | A1 | 5/2002 | Lema |
| 2002/0174430 | A1 | 11/2002 | Ellis et al. |
| 2003/0110499 | A1 | 6/2003 | Knudson et al. |
| 2005/0251827 | A1 | 11/2005 | Ellis et al. |

(Continued)

OTHER PUBLICATIONS

U.S. Appl. No. 15/397,539, filed Jan. 3, 2017, Kevin Bruce Lenhart.

*Primary Examiner* — Gabrielle A McCormick
(74) *Attorney, Agent, or Firm* — Haley Guiliano LLP

(57) ABSTRACT

Identification information related to a device may be received that includes user information and device information. Based on the user information, a user entry corresponding to the user information may be located in a database of user records. It may be determined that the device information is not found in the user entry. A plurality of sales attributes may be determined in response. Those may include at least one of (1) a release date of the device and a purchase date indicating when the user purchased the device, and (2) a release price of the device and a current price of the device at the purchase date. Based on the information, a purchase metric may be computed and the device information stored in the previously purchased device field of the entry. Based on the purchase metric, a purchase metric threshold may be generated for recommending another device to the user.

16 Claims, 9 Drawing Sheets

(56) References Cited

U.S. PATENT DOCUMENTS

| | | |
|---|---|---|
| 2009/0163183 A1 | 6/2009 | O'Donaghue |
| 2010/0082427 A1 | 4/2010 | Burgener et al. |
| 2010/0153885 A1 | 6/2010 | Yates |
| 2012/0078718 A1 | 3/2012 | Oka |
| 2014/0279263 A1 | 9/2014 | Liu |
| 2015/0046281 A1 | 2/2015 | Shivaswamy |
| 2015/0088862 A1* | 3/2015 | Umeda .............. G06Q 30/0629 |
| | | 707/722 |
| 2015/0154685 A1* | 6/2015 | Pope .................. G06Q 30/0631 |
| | | 705/26.62 |
| 2015/0235275 A1 | 8/2015 | Shah |
| 2015/0339759 A1* | 11/2015 | Pope .................. G06F 16/2423 |
| | | 705/26.62 |
| 2016/0300144 A1* | 10/2016 | Santhanam ........ G06Q 30/0631 |
| 2017/0109400 A1 | 4/2017 | Moore |
| 2018/0189856 A1 | 7/2018 | Lenhart |

* cited by examiner

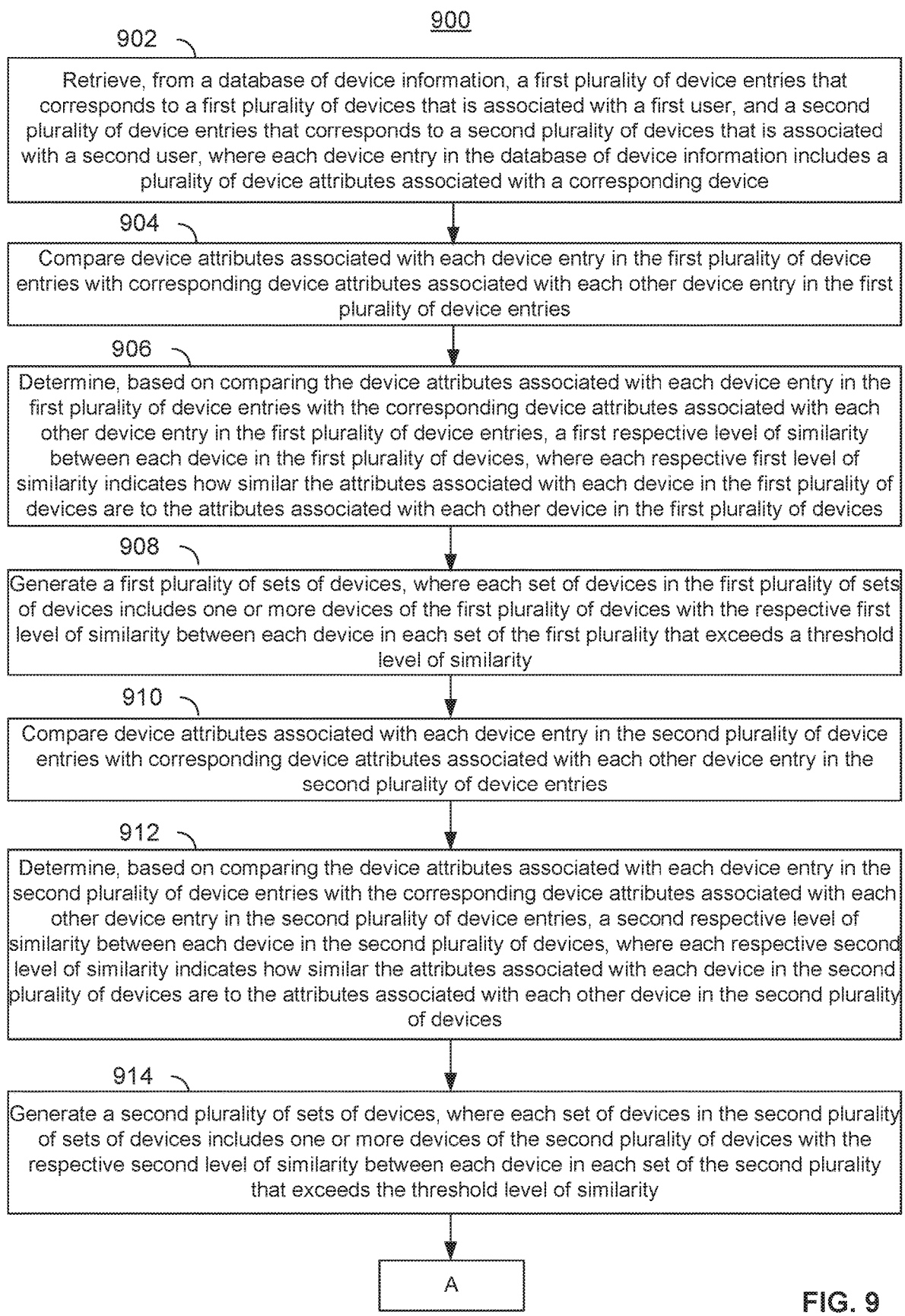

SYSTEMS AND METHODS FOR RECOMMENDING ELECTRONIC DEVICES BASED ON USER PURCHASE HABITS

BACKGROUND

Various systems are available for advertisers to recommend electronic devices to the public. For example, some systems enable recommending devices to a user based on price or specific requirements that a user has for a specific electronic device (e.g., that a laptop is able to play DVD movies). However, these recommendations lack a desired level of accuracy when recommending electronic devices to a user.

SUMMARY

Accordingly, systems and methods are described herein for generating product recommendations based on user purchase patterns. In some aspects systems and methods are described herein for recommending a device to a user based on a purchase metric associated with the user. A media guidance application may be configured to recommend a device to a user based on a purchase metric. It should be noted that the methods and systems disclosed herein will be described as executed by a media guidance application. However, these methods and systems may be implemented outside of a media guidance application. For example, these methods and systems may be implemented by any application or system that tracks user behavior.

The media guidance application may receive identification information related to a device, the identification information including user information (e.g., information related to the owner of the device) and device information (e.g., device specifications and attributes). The media guidance application may locate, in a database of user records and based on the user information, a user entry corresponding to the user information. The user entry may include a previously purchased devices field that includes a list of devices purchased by the user. The media guidance application may determine that the device information is not found in the user entry, thereby determining that this is a new device that was recently purchased by the user. The media guidance application may, in response, determine a plurality of sale attributes that may include at least one of (1) a release date of the device and a purchase date indicating when the user purchased the device, and (2) a release price of the device and a current price of the device at the purchase date. Based on the sale attributes, the media guidance application may compute a purchase metric associated with the user and store the device information in the previously purchased device field of the user entry. In some embodiments, the media guidance application may store an identification value associated with the device in the previously purchased devices field. The identification value may be associated with the device information stored in its own data structure (e.g., a table row). In yet some embodiments, the media guidance application may store a pointer to a data structure associated with the device (e.g., a table row) in the previously purchased devices field. Additionally or alternatively, the media guidance application may store the device information in a data structure associated with the user. The media guidance application may generate, based on the purchase metric, a purchase metric threshold for recommending another device to the user.

The media guidance application may receive device and user information for a device (e.g., a device that is accessing the media guidance application). Specifically, the media guidance application may receive identification information related to a first device, the identification information including both user information associated with a given user and device information associated with the first device. For example, the media guidance application may receive device information from a mobile device with which a user is accessing the media guidance application. The device information may include a serial number and a user ID that enables the user to access the media guidance application. Based on that information, the media guidance application may retrieve (e.g., from one or more databases) other information related to both the device and the user.

The media guidance application may retrieve a record associated with the user corresponding to the user information. Specifically, the media guidance application may locate, in a database that includes records of devices purchased by users, a user entry that includes a user identification field that matches the user information included in the identification information, the user entry including a previously purchased devices field. For example, the media guidance application may use a user ID assigned to the user in order to locate an entry associated with the user. That entry may include various user fields with corresponding values, including a previously purchased devices field. The previously purchased devices field may include a list of devices with which the user has previously accessed the media guidance application. Additionally or alternatively, the list of devices may include devices that were associated with the user via other means. For example, if the device is a smart phone, the device may be associated with the user through the cellular service provider. In some embodiments, the device may be associated with the user through the device manufacturer's database that links users to purchased devices. Additionally or alternatively, the list may be populated through any third party application.

The media guidance application may determine whether the user is using a device unknown to the system (e.g., a newly purchased device). Specifically, the media guidance application may determine whether the identification information is found in the user entry by searching the previously purchased devices field of the user entry for the device information received in the identification information. For example, a user may be associated with multiple devices (e.g., based on a list of devices in the previously purchased devices field of the user entry). The media guidance application may search for an identifier (e.g., a device serial number) in the previously purchased devices field that matches the identifier associated with the device that the user is using to access the media guidance application. It should be noted that a Media Access Control (MAC) address associated with the first device may be used as part of the identifier or as the identifier to search for in the previously purchased devices field. In general, any identifier that can be matched between the first device and the previously purchased devices field may be used as an identifier.

If the media guidance application determines that the user is using a device unknown to the system (e.g., a newly purchased device), the media guidance application may obtain sale attributes associated with that device. Specifically, the media guidance application may, in response to determining that the identification information is not found in the user entry, determine a plurality of sale attributes associated with the first device, the plurality of sale attributes including at least one of (1) a release date of the first device and a purchase date indicating when the given user purchased the first device, and (2) a release price of the first device and a purchase price of the first device at the purchase date. For example, the media guidance application may determine (e.g., by searching device information associated with the device) a date indicating when the first device was first released, and a date indicating when the first device was purchased. In some embodiments, the media guidance application may determine when the first device was purchased by accessing a data structure associated with the sale attributes and retrieving the date indicating when the first device was purchased. In some embodiments, the media guidance application may set, as the purchase date, the date that the user first connects to the media guidance application with the first device. Additionally or alternatively the media guidance application may determine (e.g., by searching device information associated with the device) the price of the first device at release and the price at which the first device was purchased by the user. This information may be retrieved from a database of device retail information.

The media guidance application may compute a purchase metric based on the plurality of sales attributes. Specifically, the media guidance application may compute, for the given user, a purchase metric based on the plurality of sale attributes by determining a difference between at least one of (1) the release date of the first device and the purchase date indicating when the given user purchased the first device, and (2) the release price of the first device and the purchase price of the first device at the purchase date. For example, the media guidance application may determine that the first device was released on Oct. 1, 2015 and purchased on Oct. 1, 2016. Thus, a purchase metric, based on this information, may include a purchase delay of one year. It should be noted that purchase delay may be stored in any suitable units (e.g., years, days, hours, or another suitable unit). In another example, the media guidance application may determine that the first device was priced at $650 at release, and that the given user bought the device when it was priced at $350. Thus, the media guidance application may determine that the user's preferred discount is $300. The media guidance application may include the preferred discount in the purchase metric. It should be noted that the preferred discount may be a monetary value (e.g., $300). In some embodiments, the preferred discount may be a percentage of the release price or another suitable value. In some embodiments, the media guidance application may include both the preferred discount and the purchase delay in the purchase metric.

The media guidance application may update the user's associated devices with the new device. Specifically, the media guidance application may store the device information in the previously purchased devices field of the user entry. For example, the user entry may have two known associated devices (e.g., a tablet and laptop). The media guidance application may have determined above that a new device (e.g., a smart phone) has been used by the user and thus, may update, with the new device, the user's entry.

The media guidance application may generate, based on the purchase metric, a purchase metric threshold for recommending a second device to the given user. For example, the media guidance application may generate a data structure that includes at least one of a preferred discount and purchase delay in the data structure. Thus, in order to recommend a new device to a user, the media guidance application may calculate for the new device at least one of the preferred discount and purchase delay. The media guidance application may compare the calculated value(s) with the purchase metric threshold to determine whether the new device should be recommended. In some embodiments, the purchase metric threshold may include a criterion for when the purchase metric threshold is met. For example, a criterion for a purchase metric threshold that includes both the preferred discount and purchase delay may be that at least one of these measures must be exceeded by the purchase metric of a new device in order to recommend the new device. Another criterion may be that both the preferred discount and purchase delay must be exceeded by the purchase metric of the new device in order to recommend the new device.

In some embodiments, the media guidance application may perform the following actions when computing the purchase metric. Specifically, the media guidance application may compare the purchase date of the first device with the release date of the first device. The media guidance application may determine, based on the comparing, an amount of purchase delay, and compute the purchase metric based on the amount of purchase delay. For example, the media guidance application may determine that the purchase date of an electronic tablet is Apr. 1, 2014 and the release date is Apr. 1, 2013. Thus, the purchase delay in this case is 365 days. The media guidance application may add, to the purchase metric, the value of 365 days as a parameter.

In some embodiments, the media guidance application may perform the following actions when computing the purchase metric. The media guidance application may compare the release price of the first device with the purchase price of the first device. The media guidance application may determine, based on the comparing, a preferred discount, and compute the purchase metric based on the preferred discount. For example, the media guidance application may determine that the user purchased a device for a price $450 while the price at release date was $650. Thus, the media guidance application may determine that the preferred discount is $200. The media guidance application may add, to the purchase metric, the value of $200 as a parameter.

In some embodiments, the media guidance application may store the purchase metric together with the sale attributes in a record. Specifically, the media guidance application may generate a purchase metric record for the purchase metric, where the purchase metric record includes a plurality of fields for the plurality of sale attributes. The media guidance application may store the purchase metric and the plurality of sale attributes in the plurality of fields, where each of the release date of the first device, the release price of the first device, the purchase date indicating when the given user purchased the first device, and the purchase price of the first device at the purchase date are assigned to a field of the plurality of fields. This particular arrangement enables easy access to the purchase metric and the parameters of the purchase metric.

In some embodiments, the media guidance application may update the purchase metric and the purchase metric threshold based on purchased data for multiple devices that the user has previously purchased and are known to the media guidance application. Specifically, the media guidance application may retrieve data for a plurality of previously purchased devices from the previously purchased devices field. The media guidance application may determine, based on the data, for each device of the plurality of previously purchased devices, a corresponding plurality of sale attributes, where each corresponding plurality of sale attributes includes a release date of a corresponding previously purchased device, a release price of the corresponding previously purchased device, a corresponding purchase date indicating when the given user purchased the corresponding previously purchased device, and a current price of the corresponding previously purchased device at the corresponding purchase date. The media guidance application may store, in the purchase metric record, each corresponding plurality of sale attributes. The media guidance application may update, for the given user, the purchase metric based on each corresponding plurality of sale attributes, and also update, based on the updated purchase metric, the purchase metric threshold for recommending the second device to the given user.

For example, the media guidance application may select smart phones in a user's list of previously purchased devices and retrieve purchase data related to the smart phones. The media guidance application may use that data to calculate, for example, amount of purchase delay and a preferred discount. The media guidance application may update the purchase metric with this information and update the purchase metric threshold to average in that new data. Specifically, the media guidance application may calculate a weighted preferred discount and a weighted amount of purchase delay. In some embodiments, the media guidance application may, additionally or alternatively, generate a separate purchase metric and a purchase metric threshold (e.g., for smart phones) based on the retrieved purchase data. Thus, it should be noted that the media guidance application may generate multiple purchase metric thresholds, each for a specific device type (e.g., smart phone, laptop, electronic tablet, and any other suitable type). In some embodiments, the media guidance application may generate a purchase metric and a purchase metric threshold based on the full device purchase history associated with the user.

In some embodiments, the media guidance application may update, for the given user, the purchase metric with each corresponding plurality of sale attributes by performing the following actions. The media guidance application may compute a plurality of purchase metrics for the plurality of previously purchased devices based on the plurality of sale attributes, respectively. The media guidance application may calculate a weighted average of the purchase metric and the plurality of purchase metrics. For example, the media guidance application may compute a purchase metric for each device in the user's purchased devices field. The media guidance application may, for each purchase metric, retrieve a weight associated with the purchase metric and calculate a weighted average for each purchase metric.

The media guidance application may assign a weight to each purchase metric based on the purchase date. Specifically, the media guidance application may calculate the weighted average of the purchase metric and the plurality of purchase metrics by assigning a weight to each purchase metric in the plurality of purchase metrics based on a respective purchase date associated with each purchase metric in the plurality of purchase metrics. For example, the media guidance application may retrieve for each purchase metric a purchase date and assign higher weights to the purchase metrics that are associated with more recent purchase dates.

In some embodiments, a purchase metric may be based on both the amount of purchase delay and the preferred discount. Specifically, the media guidance application may retrieve the amount of purchase delay, and the preferred discount, where the amount of purchase delay and the preferred discount are both associated with the purchase metric, and compute a weighted sum of the amount of purchase delay and the preferred discount. For example, the media guidance application may equate each day of purchase delay to one dollar of preferred discount and generate a purchase metric threshold by adding the dollars of preferred discount to days of purchase delay. In another example, the media guidance application may equate each day of purchase delay to two dollars of preferred discount and calculate a weighted sum based on that equivalence.

In some embodiments, the media guidance application may identify a device from many to recommend to a user based on the purchase metric threshold. Specifically, the media guidance application may locate, in the database that includes records of devices purchased by users, a plurality of devices released on a date that follows the purchase date. The media guidance application may compute a plurality of purchase metrics for each of the plurality of devices, where each purchase metric is based on a plurality of corresponding sale attributes that includes a current date, a current price of a corresponding device, a release date of the corresponding device, and a release price of the corresponding device. The media guidance application may, based on the comparing, select a device to recommend to the second user with a corresponding purchase metric that is higher than the purchase metric threshold and that is closest to the purchase metric threshold.

For example, the media guidance application may determine that a purchase metric threshold for a first device is 465 (e.g., 365 days and $100 weighted equally) and also determine that five devices have been released after the release date of the first device. The media guidance application may determine that only two of the five devices have purchase metric values that exceed the value of 465. The media guidance application may select a device to recommend to the user with a purchase metric closest to 465 (e.g., the media guidance application may select a device with the value of 470 over a device with a value of 490).

In some embodiments, the media guidance application may recommend to a user a later version of a device that a user already owns provided that the associated purchase metric value exceeds the purchase metric threshold. Specifically, the media guidance application may compute a plurality of purchase metrics for a plurality of devices, respectively, where each purchase metric is based on a plurality of respective sale attributes that includes a current date, a current price of a corresponding device, a release date of the corresponding device, and a release price of the corresponding device. The media guidance application may compare the purchase metric threshold with each of the plurality of purchase metrics. The media guidance application may generate a set of devices with corresponding purchase metrics that are higher than the purchase metric threshold. The media guidance application may determine whether a device in the set of devices is a later version of a device in the previously purchased devices field. The media guidance application may, in response to determining that the device in the set of devices is a later version of the device in the previously purchased devices field, recommend, to the given user, the device in the set.

For example, the media guidance application may determine that a user previously purchased a laptop of a particular brand and that a newer laptop of the same brand with a purchase metric value exceeding the purchase metric threshold is available for purchase. The media guidance application may recommend that laptop to the given user.

In some aspects systems and methods are described herein for recommending a device to a user based on a user device profile associated with the user as compared with a user device profile associated with a similar user. It should be noted that in some embodiments a user may be a household of users and a user device profile may be a household device profile. Specifically, the media guidance application may retrieve device entries for a first user and a second user. It should be noted that devices associated with a user may be devices in the user's household. The media guidance application may compare attributes of devices associated with the first user with other attributes of other devices associated with the first user. The media guidance application may perform the same comparison amongst devices associated with the second user. The media guidance application may generate, based on the comparison, for devices associated with the first user, multiple sets of devices where a level of similarity between each device in each set exceeds a threshold level of similarity. The media guidance application may generate, for devices associated with the second user, sets of devices in a similar manner. The media guidance application may determine a characteristic that is unique for each set of devices for sets associated with the first user and sets associated with the second user. The media guidance application may compare the unique characteristic for each set in the sets of devices associated with the first user with a unique characteristic in the sets of devices associated with the second user to determine which sets associated with the first user match sets associated with the second user.

The media guidance application may perform the following actions when recommending a device to a user based on a user device profile associated with the user as compared with a user device profile associated with a similar user. The media guidance application may retrieve data related to devices associated with the first user and data related to devices associated with the second user. It should be noted that in some embodiments a user may be a household of users and a user device profile may be a household device profile. Specifically, the media guidance application may retrieve, from a database of device information, a first plurality of device entries that corresponds to a first plurality of devices that is associated with a first user, and a second plurality of device entries that corresponds to a second plurality of devices that is associated with a second user, where each device entry in the database of device information includes a plurality of device attributes associated with a corresponding device. It should be noted that in some embodiments, device attributes may include metadata associated with each device (e.g., device description, manufacturer information, and other suitable metadata). For example, the media guidance application may retrieve device entries associated with the first user. Those entries may include entries for two laptops, two smart phones, and two tablets. The media guidance application may also retrieve device entries associated with the second user. Those entries may include an entry for three laptops, two smart phones, two electronic tables, and an entry for a media streaming device.

The media guidance application may compare devices associated with the first user amongst themselves in order determine how similar those devices are. The comparison may be performed by comparing corresponding attributes of those devices. Specifically, the media guidance may compare device attributes associated with each device entry in the first plurality of device entries with corresponding device attributes associated with each other device entry in the first plurality of device entries. For example, the media guidance application may compare attributes of one of the laptops associated with the first user and one of the smart phones associated with the first user. Those attributes may include screen resolution, memory sizes, storage sizes, processor speed and manufacturer, number of processors, and other suitable attributes. Additionally or alternatively, the media guidance application may compare device metadata in order to determine how similar the devices are. The media guidance application may use the results of this comparison as a factor in determining whether two devices are similar enough.

The media guidance application may, based on the comparison, determine how similar each device associated with the first user is to each other device associated with the first user. Specifically, the media guidance application may determine, based on comparing the device attributes associated with each device entry in the first plurality of device entries with the corresponding device attributes associated with each other device entry in the first plurality of device entries, a first respective level of similarity between each device in the first plurality of devices, where each respective first level of similarity indicates how similar the attributes associated with each device in the first plurality of devices are to the attributes associated with each other device in the first plurality of devices. For example, the media guidance application may determine that a smart phone is very similar to another smart phone (e.g., a level of similarity of 95%) while a smart phone is not as similar to an electronic tablet (e.g., level of similarity of 85%).

The media guidance application may generate, for devices associated with the first user, one or more sets of devices that are similar enough to each other based on a threshold value of similarity. Specifically, the media guidance application may generate a first plurality of sets of devices, where each set of devices in the first plurality of sets of devices includes one or more devices of the first plurality of devices with the respective first level of similarity between each device in each set of the first plurality that exceeds a threshold level of similarity. For example, the media guidance application may generate, for the devices associated with the first user, one set for the laptops (e.g., because the laptops have a level of similarity that exceeds a threshold level of similarity). The media guidance application may also generate a set for smart phones, and another set for electronic tablets.

The media guidance application may also compare devices associated with the second user amongst themselves in order to determine how similar those devices are. Specifically, the media guidance application may compare device attributes associated with each device entry in the second plurality of device entries with corresponding device attributes associated with each other device entry in the second plurality of device entries. For example, the media guidance application may compare attributes of one of the laptops associated with the second user and one of the smart phones associated with the second user. Those attributes may include screen resolution, memory sizes, storage sizes, processor speed and manufacturer, number of processors, and other suitable attributes.

The media guidance application may, based on the comparison, determine how similar each device associated with the second user is to each other device associated with the second user. Specifically, the media guidance application may determine, based on comparing the device attributes associated with each device entry in the second plurality of device entries with the corresponding device attributes associated with each other device entry in the second plurality of device entries, a second respective level of similarity between each device in the second plurality of devices, where each respective second level of similarity indicates how similar the attributes associated with each device in the second plurality of devices are to the attributes associated with each other device in the second plurality of devices. For example, the media guidance application may determine that a smart phone is very similar to another smart phone (e.g., a level of similarity of 95%) while a smart phone is not as similar to an electronic tablet (e.g., level of similarity of 85%). The media guidance application may also determine that each smart phone is even less similar to each laptop (e.g., level of similarity of 65%).

The media guidance application may generate, for devices associated with the second user, one or more sets of devices that are similar enough to each other based on a threshold level of similarity. Specifically, the media guidance application may generate a second plurality of sets of devices, where each set of devices in the second plurality of sets of devices includes one or more devices of the second plurality of devices with the respective second level of similarity between each device in each set of the second plurality that exceeds the threshold level of similarity. For example, the media guidance application may generate, for the devices associated with the second user, one set for the laptops (e.g., because the laptops have a level of similarity that exceeds a threshold level of similarity). The media guidance application may also generate a set for smart phones, another set for electronic tablets, and a set for the media streaming device.

The media guidance application may categorize each set of devices (both sets corresponding to devices associated with the first and sets corresponding to devices associated with the second user) based on a unique characteristic associated with each set. Specifically, the media guidance application may determine, for each respective set of the first plurality of sets, a characteristic that is associated with the respective set, and that is not associated with another set of the first plurality of sets. The media guidance application may also determine, for each respective set of the second plurality of sets, a characteristic that is associated with the respective set, and that is not associated with another set of the second plurality of sets. For example, a characteristic for the laptop set may be a built-in physical keyboard. A characteristic for a set containing tablet devices may be an on screen keyboard with a screen size greater than a threshold size.

The media guidance application may attempt to match sets associated with the first user with sets associated with the second user. Specifically, the media guidance application may compare, for each of the first plurality of sets, the characteristic that is associated with the respective set in the first plurality of sets with the characteristic that is associated with the respective set in the second plurality of sets. For example, the media guidance application may compare "the built-in physical keyboard" characteristic associated with a set corresponding to the first user with each set corresponding to a second user to determine whether there is a matching set.

If the threshold amount of sets match based on comparing the characteristics, the media guidance application may recommend a device to the first user based on a set that does not match any set of the first user. Specifically, the media guidance application may, in response to determining that the threshold amount of the first plurality of sets matches the second plurality of sets, recommend, to the first user, a device with a characteristic that is associated with a set of the second plurality of sets and is not associated with any set in the first plurality of sets. For example, if the first user doesn't have a media streaming device but the second user does have a media streaming device, the media guidance application may recommend the media streaming device to the first user. Thus, the media guidance application has determined that two user or household profiles are similar enough that if the first user or household doesn't have a device that a second user or household has, the first user or household may be interested in purchasing the missing device. Thus, that device is recommended to the first user or household.

In some embodiments, each set of devices that is associated with the second user may have a corresponding set of devices that is associated with the first user. Thus, the media guidance application may not be able to recommend a device based on a set associated with the second user that doesn't match a set associated with the first user. In these instances, the media guidance application may recommend another device to the first user. Specifically, the media guidance application may determine, based on a respective characteristic of each set in the first plurality of sets and the second plurality of sets, that each set in the second plurality of sets matches a set in the first plurality of sets. The media guidance application may, in response to the determining, select a first set of the first plurality of sets of devices, and determine a second set of the second plurality of sets of devices, where the associated characteristic of the first set matches the associated characteristic of the second set. The media guidance application may compute a first number of devices in the first set and a second number of devices in the second set, and, in response to determining that the number of devices in the second set exceeds the number of devices in the first set, recommend, to the first user, a device matching a characteristic associated with the second set.

For example, the media guidance application may determine that both the first user and the second user have a number of laptops, smart phones, and electronic tablets. The media guidance application may determine that both the first user and the second user have two laptops and two smart phones. However, the media guidance application may determine that the first user has two electronic tablets and the second user has three electronic tablets. Thus, the media guidance application may recommend an electronic tablet to the first user.

In some embodiments, the media guidance application may, when selecting the first set of devices, determine a number of devices in each set of devices in the first plurality of sets of devices, and select, based on the determining, a set of devices that includes a smallest number of devices. For example, the media guidance application may start with a set of devices that has the smallest number of devices so that the media guidance application may recommend a device of a type of which the user has the least.

In some embodiments, the media guidance application may compare the device attributes associated with each device entry in the first plurality of device entries with the corresponding device attributes associated with each other device entry in the first plurality of device entries by performing the following actions. The media guidance application may select a first device in the first plurality of devices and a second device in the first plurality of devices, and determine a first plurality of numerical attributes associated with the first device and a second plurality of numerical attributes associated with the second device, where each numerical attribute is one that can be numerically compared with another numerical attribute in order to determine which attribute is greater. The media guidance application may compare each numerical attribute in the first plurality of numerical attributes with a corresponding attribute in the second plurality of numerical attributes to determine a plurality of differences between corresponding numerical attributes, and compare each of the plurality of differences with an attribute threshold to determine whether each difference exceeds the attribute threshold. The media guidance application may determine, based on comparing each of the plurality of differences with the attribute threshold, a plurality of matching attributes with corresponding differences in the plurality of differences that do not exceed the attribute threshold, and store the plurality of matching attributes.

For example, the media guidance application may select two devices to compare, and identify corresponding attributes for the two devices that are numerical. Those attributes may include, screen size, screen resolution, memory size, storage size, and other suitable attributes. The media guidance application may compare those corresponding attributes for the two devices and determine a difference for each attribute (e.g., if one device has 240 GB of storage and another device has 266 GB of storage, the media guidance application may determine that a difference is 26 GB). The media guidance application may determine whether the 26 GB difference exceeds a threshold. For example, the attribute threshold may be 15%, and because the difference between the storage sizes is less then 15%, therefore, the media guidance application may determine that these two attributes match.

In some embodiments, the media guidance application may determine the respective level of similarity between each device in the first plurality of devices by performing the following actions. The media guidance application may retrieve, for the plurality of matching attributes, a weight associated with each attribute in the plurality of attributes, and compute a weighted sum of a number of attributes in the plurality of matching attributes. The media guidance application may assign the weighted sum as the level of similarity between the first device and the second device. For example, the memory size attribute may not be weighted as highly as the screen size attribute because screen size may be a much better differentiator of devices than memory size.

In some embodiments, the media guidance application may generate the first plurality of sets of devices by performing the following actions. The media guidance application may select a first device and a second device in the first plurality of devices with a corresponding level of similarity that exceeds the threshold level of similarity, and generate a first set of devices including the first device and the second device. The media guidance application may select a third device in the first plurality of devices, and determine whether the level of similarity between both (1) the first device and the third device, and (2) the second device and the third device, respectively, exceeds the threshold level of similarity. The media guidance application may, in response to determining that the level of similarity between both (1) the first device and the third device, and (2) the second device and the third device, respectively, does not exceed the threshold level of similarity, generate a second set of devices including the third device.

For example, the media guidance application may determine that two devices exceed the threshold level of similarity when the threshold level of similarity is 90%. The two devices may be 95% similar to each other. The media guidance application may select a third device for potential addition to the set of the two devices. The media guidance application may determine that the third device has a 92% level of similarity with the first device and 87% level of similarity with the second device. Thus, the third device does not exceed the threshold level of similarity with the second device, and, therefore, the media guidance application may generate another set for the third device.

In some embodiments, the media guidance application may recommend, to the first user, the device with the characteristic that is associated with the set of the second plurality of sets and is not associated with any set in the first plurality of sets by performing the following actions. The media guidance application may determine, based on device information associated with the user, that the user prefers to purchase devices at a discount rate. The media guidance application may, in response to the determining, retrieve, from the database of device information, one or more device entries that match the characteristic, retrieve, for the one or more device entries, a corresponding price, and recommend, to the user, the device that is associated with a price that is smaller than any other price. For example, the media guidance application may determine that the user, given a choice, prefers to buy devices at a discount. Based on that determination, the media guidance application may recommend to the user, from all devices that exceed the threshold level of similarity, a device that is least expensive. In some embodiments, the media guidance application may recommend a device that meets certain discounting thresholds. For example, the media guidance application may determine that the user prefers a specific discount or a specific percentage discount, and recommend the device that is closest to the discounting threshold.

In some embodiments, the media guidance application may determine, based on the device information associated with the user, that the user prefers to purchase devices at the discount rate by performing the following actions. The media guidance application may retrieve a purchase metric associated with the user, and determine, based on a preferred discount value associated with the purchase metric, that the user prefers to purchase devices at the discount rate. For example, if the purchase metric includes a preferred discount parameter that is greater than zero, the media guidance application may determine that the user prefers to purchase electronic devices at a discount rate.

In some embodiments, the media guidance application may recommend, to the first user, the device with the characteristic that is associated with the set in the second plurality of sets and is not associated with any set in the first plurality of sets by performing the following actions. The media guidance application may determine, based on device information associated with the user, that the user prefers to delay purchasing devices after those devices are released. The media guidance application may, in response to the determining, retrieve, from the database of device information, one or more device entries that match the characteristic, retrieve, for the one or more device entries, a corresponding release date, and recommend, to the user, the device that is associated with a release date that is closest to a preferred delay. For example, if multiple devices are identified that may be recommended to the first user, the media guidance application may recommend the device that was released closest to the duration of the preferred delay.

In some embodiments, the media guidance application may use a purchase metric that was generated for recommending a device to a user based on a user device profile associated with the user or a device profile associated with a household as compared with a user device profile associated with a similar user or a similar household to determine that a user or a household prefers to purchase devices after they are released and not when they are release date. It should be noted that determining that the user or the household prefers to purchase devices after release date may include setting a threshold number of days after the release date so that if the device is purchased before the threshold number of days elapses, the media guidance application may determine that the device was purchased on the release date. The media guidance application may receive the threshold from a system administrator.

In some embodiments, the media guidance application may determine, based on device information associated with the user, that the user prefers to purchase devices after a release date by performing the following actions. The media guidance application may retrieve a purchase metric associated with the user, and determine, based on a preferred delay value associated with the purchase metric, that the user prefers to wait to purchase devices after the release date, where the wait is based on the preferred delay. For example, the media guidance application may, if the purchase metric includes a purchase delay metric, determine that the user prefers to wait to purchase a device after it has been on the market for a specific amount of time (e.g., a time equal to the purchase delay).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
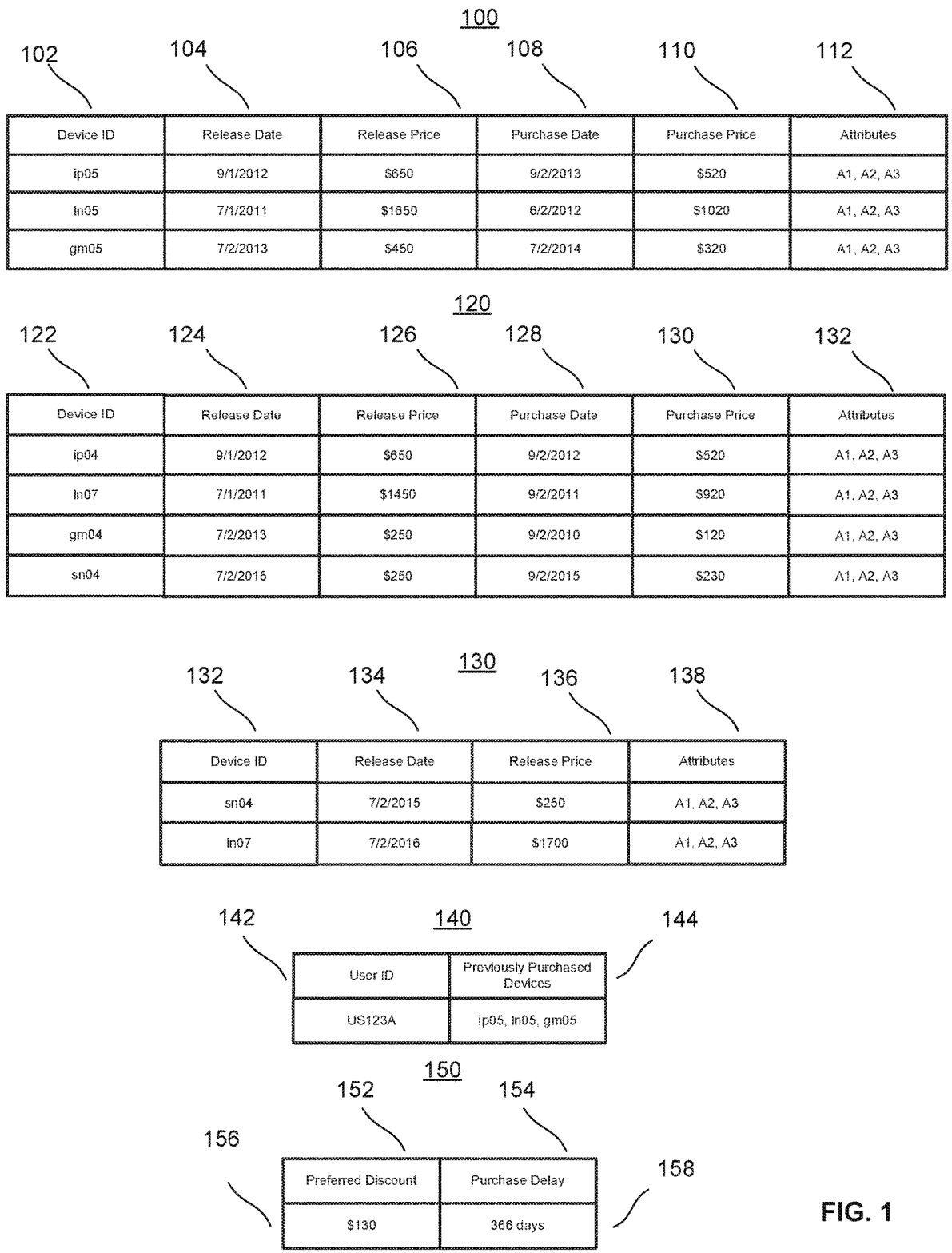
FIG. 1 depicts four data structures used in conjunction with recommending electronic devices to users, in accordance with some embodiments of the disclosure.

Systems and methods are described herein for generating product recommendations based on user purchase patterns.

In some embodiments, systems and methods are described herein for generating a purchase metric and a purchase metric threshold for recommending a device to a user. As referred to herein, the term "purchase metric" refers to a plurality of values of purchase data that when combined may be used to identify under which conditions a user has bought an electronic device. For example, a purchase metric may be a data structure that combines sale information and release information associated with a device. That sale information may include purchase date and purchase price, while the release information may include release date and release price. In some embodiments, the purchase metric may include specific values that denote a difference between corresponding sale parameters and release parameters (e.g., a difference between release price and purchase price). As referred to herein, the term "purchase metric threshold" refers to one or more values that may be compared with values associated with a purchase metric in order to determine whether the purchase metric meets or exceeds the purchase metric threshold. For example, a purchase metric threshold may be a combination of values such as a combination of preferred discount (e.g., 100 dollars) and purchase delay (e.g., 25 days)

A media guidance application may be used to perform the actions described below in order to generate a purchase metric threshold. The media guidance application may generate the purchase metric threshold by performing the actions below. The media guidance application may receive identification information related to a device, the identification information including user information (e.g., information related to the owner of the device) and device information (e.g., device specifications and attributes). The media guidance application may locate, in a database of user records and based on the user information, a user entry corresponding to the user information. The user entry may include a previously purchased devices field that includes a list of devices purchased by the user. The media guidance application may determine that the device information is not found in the user entry, thereby determining that this is a new device that was recently purchased by the user. The media guidance application may, in response, determine a plurality of sale attributes that may include at least one of (1) a release date of the device and a purchase date indicating when the user purchased the device, and (2) a release price of the device and a current price of the device at the purchase date. Based on the sale attributes, the media guidance application may compute a purchase metric associated with the user and store the device information in the previously purchased device field of the entry. The media guidance application may generate, based on the purchase metric, a purchase metric threshold for recommending another device to the user.

The media guidance application may receive device and user information for a device (e.g., a device that is accessing the media guidance application). Specifically, the media guidance application may receive identification information related to a first device, the identification information including both user information associated with a given user and device information associated with the first device. For example, a user may be accessing the media guidance application from a mobile device. The user may access a media guidance application located on user television equipment or at a server. It should be noted that in some embodiments, the user may access some functions of the media guidance application on user television equipment and some functions on a server. The media guidance application may require that the user authenticate before enabling the user to access the functions of the media guidance application. The user may access the media guidance application by supplying user credentials (e.g., username and password, biometric identification, device identification, or other suitable credentials). In some embodiments, the media guidance application may identify a user or a household based on the location from which the media guidance application is accessed, for example, a location associated with the user's home. The media guidance application may retrieve the identification from the device including both device information combined with the user information.

In some embodiments, the media guidance application may use the user's supplied credentials to identify a user and query a database of user information for information associated with the user. The media guidance application may also query the user's device for device identification. The media guidance application may query a database of device information for device information.

The media guidance application may retrieve a record associated with the user corresponding to the user information. Specifically, the media guidance application may locate, in a database that includes records of devices purchased by users, a user entry that includes a user identification field that matches the user information included in the identification information, the user entry including a previously purchased devices field. For example, the media guidance application may use a user ID assigned to the user in order to locate an entry associated with the user. The media guidance application may query the database of user information using a user ID received from the user's device. The media guidance application may receive from the database a data structure that includes the user's information including the previously purchased devices field.

The media guidance application may determine whether the user is using a device unknown to the system (e.g., a newly purchased device). Specifically, the media guidance application may determine whether the identification information is found in the user entry by searching the previously purchased devices field of the user entry for the device information received in the identification information. For example, the media guidance application may retrieve from the user's entry the previously purchased devices field and store the information included in the previously purchased devices field in a data structure. Each device in the data structure may include a device identification parameter. The media guidance application may compare each device identification parameter with a device identification associated with the device that the user is using to access the media guidance application. It should be noted that a Media Access Control (MAC) address associated with the first device may be used as part of the identifier or as the identifier to search the information in the previously purchased devices field. In general, any identifier that can be matched between the first device and the previously purchased devices field may be used for searching.

If the media guidance application determines that the user is using a device unknown to the system (e.g., a newly purchased device), the media guidance application may obtain sales attributes associated with that device. Specifically, the media guidance application may, in response to determining that the identification information is not found in the user entry, determine a plurality of sale attributes associated with the first device, the plurality of sale attributes including at least one of (1) a release date of the first device and a purchase date indicating when the given user purchased the first device, and (2) a release price of the first device and a purchase price of the first device at the purchase date. For example, the media guidance application may search a device database associated with the device maker to determine device information associated with the device. In some embodiments, the media guidance application may perform the search by directly querying the database associated with the device maker. However, in some embodiments, the media guidance application may transmit a query to a server associated with a service provider. In some embodiments, the media guidance application may search for this information in a point of sale database. Additionally or alternatively, the media guidance application may retrieve release date information, release price information, and current price information from a third party. The third party may maintain a database of different products and release price and date information associated with those products as well as current price information. The media guidance application may transmit a product code to the database and receive back, from the database, release date, release price, and current price information associated with the product code. When the media guidance application matches the proper device ID, the media guidance application may retrieve a date indicating when the first device was first released, and a date indicating when the first device was purchased. Additionally or alternatively the media guidance application may retrieve (e.g., by performing actions that are similar to what is described above) the price of the first device at release and the price at which the first device was purchased by the user.

The media guidance may compute a purchase metric based on the plurality of sale attributes. Specifically, the media guidance application may compute, for the given user, a purchase metric based on the plurality of sale attributes by determining a difference between at least one of (1) the release date of the first device and the purchase date indicating when the given user purchased the first device, and (2) the release price of the first device and the purchase price of the first device at the purchase date. For example, the media guidance application may store the sale attributes in a data structure such as data structure 100 (FIG. 1). Data structure 100 may include fields 102, 104, 106, 110, and 112. Field 102 is labeled device ID and may be used to store an identifier associated with a device. A Device ID may include any of a MAC address, a serial number, an alphanumeric string, or another suitable entry that uniquely identifies a device.

Field 104 may be used to store a release date associated with a device. As described above, the media guidance application may retrieve the release date from one of multiple locations. For example, the media guidance application may retrieve the release date from a database maintained by the device manufacturer, or another suitable location. Field 106 may be used to store a release price. The media guidance application may retrieve the release price from any of the sources that it retrieves the release date. For example, the media guidance application may retrieve the release price from the manufacturer of the device.

Field 108 may be used to store a purchase date associated with the device. The media guidance application may retrieve the purchase date from a database maintained by the manufacturer, a database maintained by the seller of the device, a database maintained by the service provider of the device, or another suitable location. In some embodiments, the media guidance application may retrieve the purchase date from the device itself (e.g., based on when a profile associated with the user was created on the device).

Filed 110 may be used to store a purchase price associated with the device. The media guidance application may retrieve the purchase price from a database maintained by the manufacturer, a database maintained by the seller of the device, a database maintained by the service provider of the device, or another suitable location.

Field 112 may be used to store attributes associated with the corresponding device. As illustrated in data structure 100 the attributes field may include pointers to specific data structures that hold specific attributes. For example, A1 may be a pointer to a data structure that holds a resolution attribute for the device. In some embodiments, (not shown), there may be only on pointer to one data structure that holds all the attributes associated with the device. In yet some embodiments, the attributes may be stored in the attributes field in a specific format that may be readable by the media guidance application (e.g., XML format).

For example, the media guidance application may be accessed by a device with a device ID of ip05, which may have been determined to be a device that doesn't exist in the previously purchased devices field associated with the user. The media guidance application may calculate a purchase metric based on sale information associated with device ip05. In some embodiments, the media guidance application may calculate a purchase metric based on purchase delay. The media guidance application may retrieve release date 104 and purchase date 108 from data structure 100 for device ip05. The media guidance application may execute a date comparison function between the release date and the purchase date to determine an amount of purchase delay (i.e., the amount of time between purchasing the device and the time the device was released). In some embodiments, the amount of purchase delay may be the purchase metric.

In some embodiments, the media guidance application may calculate the purchase metric based on preferred discount. The media guidance application may retrieve release price 106 and purchase price 110 associated with device ip05. The media guidance application may execute a comparison function to determine the difference between the release price and the purchase price (i.e., the preferred discount). In some embodiments, the preferred discount may be the purchase metric. In some embodiments, the purchase metric may be a combination of the preferred discount and the purchase delay.

The media guidance application may update the user's associated devices with the new device. Specifically, the media guidance application may store the device information in the previously purchased devices field of the user entry. For example, if it is determined that a device with device ID ip05 is a newly purchased device, the media guidance application may transmit a query to the database that includes records of devices purchased by users to update the previously purchased device field of the given user with the device ID (e.g., ip05). Data structure 140 is an example of one possible data structure that may be used to link user information with previously purchased device information. It should be noted that data structure 140 may have other fields (e.g., user information such as name, preferences, and other suitable fields). Data structure 140 includes user ID field 142 that stores an identifier associated with a user. A user with user ID US123A is exemplified as one of the entries in the data structure. Previously purchased devices field 144 includes a list of devices that are known to be associated with the user or are known to be previously purchased by the user. It should be noted that field 144 exemplifies a list of devices associated with the first user or the first household as shown in data structure 100. In some embodiments, field 144 may include pointers to data structure that include respective device information for each device that is associated with the user.

The media guidance application may generate, based on the purchase metric, a purchase metric threshold for recommending a second device to the given user. For example, data structure 150 exemplifies a purchase metric threshold based on both the preferred discount and the purchase delay. Field 152 stored the preferred discount while filed 154 stores the purchase delay. Values 156 and 158 represent the preferred discount and purchase delay respectively. In some embodiments, value 156 and 158 may be calculated for multiple devices that the user has purchased in the past. These values may be a weighted average of the corresponding sale attributes. In yet some embodiments, the purchase metric may be stored as at least one of a purchase discount and purchase delay for multiple devices. For example, multiple rows of values 156 and 158 respectively may be stored in data structure 150. The media guidance application may calculate the purchase metric by averaging out the purchase delay with the preferred discount. In some embodiments, the media guidance may calculate the purchase metric threshold as described below. For example, the media guidance application may retrieve a ratio to use in the averaging process between each dollar of preferred discount and each day of purchase delay (e.g., one dollar being equivalent to one day). The media guidance application may calculate a single value for the purchase metric threshold by multiplying the ratio by each dollar and by each day and then calculating an average of that multiplication. For example, if there is a preferred discount of one hundred dollars and purchase delay of 100 days with a ratio of days to dollars of one, the media guidance application may calculate the purchase metric threshold as the value one hundred. If the ratio is the ratio is changed to one day being equivalent to half of a dollar, the media guidance application may calculate the purchase metric threshold using one hundred days of purchase delay and one hundred dollars of preferred discount as illustrated below:

$$((100*1)+(100*½))/2$$

Based on this calculation the purchase metric threshold will be a value of seventy five.

In some embodiments, the media guidance application may perform the following actions when computing the purchase metric. Specifically, the media guidance application may compare the purchase date of the first device with the release date of the first device. For example, the media guidance application may execute a date comparison function that calculates a difference between two dates. The media guidance application may determine, based on the comparing, an amount of purchase delay, and compute the purchase metric based on the amount of purchase delay. For example, the media guidance application may, based on the comparison, determine that there are one hundred and fifty days of purchase delay. The media guidance application may store that information in a data structure representing the purchase metric.

In some embodiments, the media guidance application may perform the following actions when computing the purchase metric. The media guidance application may compare the release price of the first device with the purchase price of the first device. The media guidance application may determine, based on the comparing, a preferred discount, and compute the purchase metric based on the preferred discount. For example, the media guidance application may calculate a difference between the purchase price and the release price. The media guidance application may determine, based on the comparing, a preferred discount, and compute the purchase metric based on the preferred discount. For example, the media guidance application may based on the comparison determine that the difference between the purchase price and release price is one hundred dollars. The media guidance application may store that information in a data structure representing the purchase metric.

In some embodiments, the media guidance application may store the purchase metric together with the sales attributes in a record. Specifically, the media guidance application may generate a purchase metric record for the purchase metric, where the purchase metric record includes a plurality of fields for the plurality of sale attributes. The media guidance application may store the purchase metric and the plurality of sale attributes in the plurality of fields, where each of the release date of the first device, the release price of the first device, the purchase date indicating when the given user purchased the first device, and the purchase price of the first device at the purchase date are assigned to a field of the plurality of fields. This particular arrangement enables easy access to the purchase metric and the parameters of the purchase metric. The media guidance application may store the purchase metric record in a database and access the record when needed.

In some embodiments, the media guidance application may update the purchase metric based on purchased data for multiple devices that the user has previously purchased and are known to the media guidance application. Specifically, the media guidance application may retrieve data for a plurality of previously purchased devices from the previously purchased devices field. For example, the media guidance application may transmit a query to a database of user information. The query may include a user identifier that the database engine may use to retrieve a record associated with the user. The media guidance application may retrieve the record and store the record in a data structure in storage. The database may be stored locally or on a remote server. In some embodiments, portions the database may be stored locally, and the media guidance application may update the remote portions of the database with local information. The media guidance application may retrieve from the data structure the information (e.g., device identifiers) from the previously purchased devices field.

In some embodiments, the media guidance application may retrieve the data for all previously purchased devices. In yet some embodiments, the media guidance application may determine metrics for only some previously purchased devices (e.g., a subset of devices). For example, the media guidance application may retrieve the data from the previously purchased devices field and determine for each device, based on the device information associated with the respective device, a type of device associated each respective device. The types of devices may include laptops, smart phones, electronic tablets, and other suitable types of device. Thus, the media guidance application may generate purchase metrics and purchase metric threshold separately for specific device types.

The media guidance application may determine, based on the data, for each device of the plurality of previously purchased devices, a corresponding plurality of sale attributes, where each corresponding plurality of sale attributes includes a release date of a corresponding previously purchased device, a release price of the corresponding previously purchased device, a corresponding purchase date indicating when the given user purchased the corresponding previously purchased device, and a current price of the corresponding previously purchased device at the corresponding purchase date.

For example, the media guidance application may use device identifiers retrieved from the previously purchased devices field to get sale data for each device. The media guidance application may generate a query for each device identifier. The queries may be transmitted to a database that stores device information (e.g., a database maintained by the corresponding device manufacturer, a database maintained by the device seller, or another suitable database). In some embodiments, the media guidance application may transmit the device identifiers to a remote server, and the remote server may generate the queries and transmit those queries to the proper databases. The media guidance application may receive sale attributes for each device identifier.

The media guidance application may store, in the purchase metric record, each corresponding plurality of sale attributes. The media guidance application may update, for the given user, the purchase metric based on each corresponding plurality of sale attributes, and may also update, based on the updated purchase metric, the purchase metric threshold for recommending the second device to the given user.

For example, the media guidance application may generate a data structure similar to data structure 100 or data structure 120, and store the sale attributes retrieved in the corresponding fields. It should be noted that in some embodiments, attributes field 112 may not be included in data structure 100. The media guidance application may calculate an amount of purchase delay and preferred discount for each record based on the stored sale attributes. The media guidance application may update the purchase metric with this information and update the purchase metric threshold to average in that new data. For example, the media guidance application may compute at least one of a preferred discount and purchase delay (based on whether the current purchase metric has one of those values or both) and add that information to the purchase metric. Thus, purchase metric 150 may be updated to include several rows each having at least one of a preferred discount and purchase delay.

In some embodiments, the media guidance application may update, for the given user, the purchase metric with each corresponding plurality of sale attributes by performing the following actions. The media guidance application may compute a plurality of purchase metrics for the plurality of previously purchased devices based on the plurality of sale attributes, respectively. The media guidance application may calculate a weighted average of the purchase metric and the plurality of purchase metrics. For example, the media guidance application may compute a purchase metric for each device in the user's purchased devices field. The media guidance application may perform the computation, for each purchase metric in the plurality as described above in relation to computing the original purchase metric.

The media guidance application may, for each purchase metric retrieve a weight associated with the purchase metric and calculated a weighted average for each purchase metric. For example, the media guidance application may transmit a query to a database that stores user information for a weight associated with each device. The media guidance application may multiply each purchase metric by its corresponding weight and calculate an average of each purchase metric in the plurality of purchase metrics together with the original purchase metric.

The media guidance application may assign a weight to each purchase metric based on the purchase date. Specifically, the media guidance application may calculate the weighted average of the purchase metric and the plurality of purchase metrics by assigning a weight to each purchase metric in the plurality of purchase metrics based on a respective purchase date associated with each purchase metric in the plurality of purchase metrics. For example, the media guidance application may retrieve each purchase metrics a purchased date. The media guidance application may assign a weight of one to the newly-purchased device and decrease the weight of each device purchased in the past based on the purchase date. Thus, the second newest device may have a weight of 0.75 and a third newest device a weight of 0.5. The media guidance application may store that information in the database for retrieval.

In some embodiments, a purchase metric may be based on both the amount of purchase delay and the preferred discount. Specifically, the media guidance application may retrieve the amount of purchase delay, and the preferred discount, where the amount of purchase delay and the preferred discount are both associated with the purchase metric, and compute a weighted sum of the amount of purchase delay and the preferred discount. For example, the media guidance application may retrieve from data structure 150 a preferred discount value and the purchase delay value. The media guidance application may retrieve from storage or a remote server a value representing a ratio of days to dollars for the calculation. It should be noted that the ratio may be based on any suitable units. For example, cents to hours, cents to day, dollars to years, and other suitable units. The ratio may be determined by the service provider or an entity maintaining the media guidance application.

In some embodiments, the media guidance application may identify a device from many to recommend to a user based on the purchase metric threshold. Specifically, the media guidance application may locate, in the database that includes records of devices purchased by users, a plurality of devices released on a date that follows the purchase date. The media guidance application may compute a plurality of purchase metrics for each of the plurality of devices, where each purchase metric is based on a plurality of corresponding sale attributes that includes a current date, a current price of a corresponding device, a release date of the corresponding device, and a release price of the corresponding device. The media guidance application may, based on the comparing, select a device to recommend to the second user with a corresponding purchase metric that is higher than the purchase metric threshold and that is closest to the purchase metric threshold.

For example, the media guidance application may generate a query using the purchase date of the first device that when executed by a database engine would return back all devices and their release information. The media guidance application may store that information as a data structure (e.g., in storage 408). Data structure 130 illustrates a portion of the devices that may be retrieved. Field 132 is a device ID field (storing a device ID that may be the same device ID as stored in field 102 or 122). Field 134 may include release date data while field 136 may include release price data. It should be noted that in some embodiments, field 138 with device attributes may be included in the data structure. However, in some embodiments, field 138 may be omitted. The media guidance application may generate a query for each device (e.g., using the device ID) and retrieve the current price of each device (e.g., from the manufacturer's database or another suitable source). The media guidance application may also execute a function to determine today's date. Based on this information, in a manner similar to that of described above in relation to generating the purchase metric, the media guidance application may generate a purchase metric for each retrieved device. The media guidance application may generate a purchase metric threshold in a manner described above for each device and recommend a device that is closest to the purchase metric threshold generated above.

In some embodiments, the media guidance application may recommend to a user a later version of a device that a user already owns provided that the associated purchase metric exceeds the purchase metric threshold. Specifically, the media guidance application may compute a plurality of purchase metrics for a plurality of devices, respectively, where each purchase metric is based on a plurality of respective sale attributes that includes a current date, a current price of a corresponding device, a release date of the corresponding device, and a release price of the corresponding device. The media guidance application may compare the purchase metric threshold with each of the plurality of purchase metrics. The media guidance application may generate a set of devices with corresponding purchase metrics that are higher than the purchase metric threshold. The media guidance application may determine whether a device in the set of devices is a later version of a device in the previously purchased devices field. The media guidance application may, in response to the determining, recommend, to the given user, the device in the set of.

For example, the media guidance application may determine that a user previously purchased a laptop of a particular brand a newer laptop of the same brand with a purchase metric value exceeding the purchase metric threshold is available for purchase. The media guidance application may recommend that laptop to the given user. The media guidance application may computer a purchase metric threshold for all available devices as described above. The media guidance application may compare the purchase metric threshold with a purchase metric threshold for each available device and generate a set of devices that may be recommended to the user. The media guidance application may retrieve (e.g., from the previously purchased devices field) device IDs associated with previously purchased devices and query a database to retrieve manufacturer information for each purchased device. The media guidance application may compare the manufacturer information with the manufacturer information of the devices in the set, and recommend a device where the manufacturer matches.

In some embodiments, systems and methods are described herein for recommending a device to a user based on a user device profile associated with the user or a device profile associated with a household as compared with a user device profile associated with a similar user or a similar household. Specifically, the media guidance application may retrieve device entries for a first user and a second user. It should be noted that devices associated with a user may be devices in the user's household. The media guidance application may compare attributes of devices associated with the first user with other attributes of other devices associated with the first user. The media guidance application may perform the same comparison amongst devices associated with the second user. The media guidance application may generate, based on the comparison, for devices associated with the first user, multiple sets of devices where a level of similarity between each device in each set exceeds a threshold level of similarity. The media guidance application may generate, for devices associated with the second user, sets of devices in a similar manner. The media guidance application may determine a characteristic that is unique for each set of devices for sets associated with the first user and sets associated with the second user. The media guidance application may compare the unique characteristic for each set in the sets of devices associated with the first user with a unique characteristic in the sets of devices associated with the second user to determine which sets associated with the first user match sets associated with the second user.

The media guidance application may perform the following actions when recommending a device to a user based on a user device profile associated with the user or based on a device profile associated with a household as compared with a user device profile associated with a similar user or a similar household. The media guidance application may retrieve data related to devices associated with the first user or first household and data related to devices associated with the second user or second household. Specifically, the media guidance application may retrieve, from a database of device information, a first plurality of device entries that corresponds to a first plurality of devices that is associated with a first user, and a second plurality of device entries that corresponds to a second plurality of devices that is associated with a second user, where each device entry in the database of device information includes a plurality of device attributes associated with a corresponding device.

For example, data structures 100 and 120 may be used to store devices together with device attributes associated with a first user and a second user respectively. Data structure 100 may include fields 104, 106, 108, and 110 which respectively may be used to store, as described above, release dates, release prices, purchase dates, and purchase prices. In some embodiments, these fields may be omitted from the data structure. Thus, data structure 100 may store a device ID 102 for each device associated with the first user and attributes field 112 which may include attributes for each corresponding device. It should be noted that data structure 100 may be stored in storage or in a database as a database table or entry. The database may be located on a remote server.

Data structure 120 may be used to store device attributes associated with the second user or a second household. Field 122 may be used to store a device ID. Fields 124, 126, 128, and 130 may be used, respectively, to store release dates, release prices, purchase dates, and purchase prices. It should be noted that in some embodiments, fields 124, 126, 128, and 130 may be omitted. Field 132 may be used to store attributes associated with the corresponding device. In some embodiments, fields 112 and 132 may be used to store pointers to data structures that contain the attributes. For example, A1, A2, and A3 may represent those pointers. In some embodiments, only one pointer may be stored in fields 112 and 132. It should be noted that data structure 120 may be stored in storage or in a database as a database table or entry. The database may be located on a remote server.

The media guidance application may compare devices associated with the first user amongst themselves in order determine how similar those devices are. The comparison may be performed by comparing corresponding attributes of those devices. Specifically, the media guidance may compare device attributes associated with each device entry in the first plurality of device entries with corresponding device attributes associated with each other device entry in the first plurality of device entries. For example, the media guidance application may select a first device associated with the first user and a second device associated with the first user for attribute comparison. The media guidance application may retrieve (e.g., from data structure 100 field 112) a first attribute associated with the first device. The media guidance application may iterate through each attribute associated with the second device and retrieve a corresponding attribute associated with the second device. The media guidance application may compare the attributes to determine whether they match. The media guidance application may iterate through each attribute associated with the first device and make the same comparison to determine which attributes match.

The media guidance application may, based on the comparison, determine how similar each device associated with the first user is to each other device associated with the first user. Specifically, the media guidance application may determine, based on comparing the device attributes associated with each device entry in the first plurality of device entries with the corresponding device attributes associated with each other device entry in the first plurality of device entries, a first respective level of similarity between each device in the first plurality of devices, where each respective first level of similarity indicates how similar the attributes associated with each device in the first plurality of devices are to the attributes associated with each other device in the first plurality of devices. As illustrated in data structure 100, corresponding attributes devices ip05, ln05, and gm05 may be compared.

For example, the media guidance application may iterate through each device associated with the first user and determine a number of attributes that match between each device. The media guidance application may calculate based on the total number of attributes and the total number of attributes that match for each device a percentage of similarity (e.g., if nine of ten attributes match between two devices those devices are ninety percent similar). The media guidance application may repeat this step for each device in order to get a level of similarity between each device and each other device associated with the first user. For example, the media guidance application may determine that each device is sixty percent similar to each other device.

The media guidance application may generate, for devices associated with the first user, one or more sets of devices that are similar enough to each other based on a threshold value of similarity. Specifically, the media guidance application may generate a first plurality of sets of devices, where each set of devices in the first plurality of sets of devices includes one or more devices of the first plurality of devices with the respective first level of similarity between each device in each set of the first plurality that exceeds a threshold level of similarity.

For example, the media guidance application may retrieve a predefined threshold level of similarity. The predefined threshold level of similarity may be supplied by the party maintaining the media guidance application, by an advertiser, or another suitable entity. The media guidance application may compare each level of similarity between two devices to the threshold level of similarity to generate the different sets. If, as discussed above, the predefined threshold of similarity is ninety percent and each of ip05, ln05, and gm05 are sixty percent similar, the media guidance application may create three sets of devices. It should be noted that if the first user has other devices, the media guidance application may create more sets of devices or add those devices to existing sets based on comparing the levels of similarity to the threshold level of similarity The media guidance application may also compare devices associated with the second user amongst themselves in order determine how similar those devices are. Specifically, the media guidance application may compare device attributes associated with each device entry in the second plurality of device entries with corresponding device attributes associated with each other device entry in the second plurality of device entries. The media guidance application may perform the comparison between devices associated with the second user in a similar manner as performing the comparison between devices associated with the first user.

The media guidance application may, based on the comparison, determine how similar each device associated with the second user is to each other device associated with the second user. Specifically, the media guidance application may determine, based on comparing the device attributes associated with each device entry in the second plurality of device entries with the corresponding device attributes associated with each other device entry in the second plurality of device entries, a second respective level of similarity between each device in the second plurality of devices, where each respective second level of similarity indicates how similar the attributes associated with each device in the second plurality of devices are to the attributes associated with each other device in the second plurality of devices. The media guidance may make the determination in a manner similar to making the determination for the devices associated with the first user.

The media guidance application may generate, for devices associated with the second user, one or more sets of devices that are similar enough to each other based on a threshold value of similarity. Specifically, the media guidance application may generate a second plurality of sets of devices, where each set of devices in the second plurality of sets of devices includes one or more devices of the second plurality of devices with the respective second level of similarity between each device in each set of the second plurality that exceeds the threshold level of similarity. The media guidance application may generate the second plurality of sets in a manner similar to generating the first plurality of sets.

Data structure 120 may represent devices associated with the second user. It should be noted that fields 124, 126, 128, and 130 may be omitted in some embodiments. Therefore, in this embodiment, only fields 122 and 132 may be part of data structure 120. Data structure 100 may represent devices associated with the first user. It should be noted that fields 104, 106, 108, and 110 may be omitted in some embodiments. Therefore, in this embodiment, only fields 102 and 112 may be part of data structure 100.

The media guidance application may categorize each set of devices (both sets corresponding to devices associated with the first and sets corresponding to devices associated with the second user) based on a unique characteristic associated with each set. Specifically, the media guidance application may determine, for each respective set of the first plurality of sets, a characteristic that is associated with the respective set, and that is not associated with another set of the first plurality of sets. The media guidance application may also determine, for each respective set of the second plurality of sets, a characteristic that is associated with the respective set, and that is not associated with another set of the second plurality of sets.

For example, the media guidance application may iterate through each attribute associated with each device of the in a first set of the first plurality of sets. The media guidance application may determine an attribute that is common to all devices in the first set (e.g., physical built-in keyboard) and use that attribute as the characteristic. A characteristic may also be made up of multiple attributes. For example, an on-screen keyboard attribute and a resolution attributes. The media guidance application may perform these actions for first and second pluralities of sets.

The media guidance application may attempt to match sets associated with the first user with sets associated with the second user. Specifically, the media guidance application may compare, for each of the first plurality of sets, the characteristic that is associated with the respective set in the first plurality of sets with the characteristic that is associated with the respective set in the second plurality of sets. For example, the media guidance application may iterate through each set in the first plurality of sets and compare for each set in the first plurality of sets the characteristic with each set in the second plurality of sets to determine if any sets in the first plurality of sets match a set in the second plurality of sets.

For example, the media guidance application may determine that a set of devices associated with device ip05 (data structure 100) may match a set of devices associated with device ip04 (data structure 120).

If the threshold amount of sets match based on comparing the characteristics, the media guidance application may recommend a device to the first user that the second user has as part of the set that does not match any set of the first user. Specifically, the media guidance application may, in response to determining that the threshold amount of the first plurality of sets matches the second plurality of sets, recommend, to the first user, a device with a characteristic that is associated with a set of the second plurality of sets and is not associated with any set in the first plurality of sets.

For example, the media guidance application may retrieve a matching threshold amount. The matching threshold amount may be set by the advertiser, an entity maintaining the media guidance application, or another suitable entity. The threshold amount may be a percentage of sets, a number of sets, or another suitable value. In the illustrative example of FIG. 1, the media guidance application may determine that sets associated with devices ip05 and ip04, ln05 and ln07, gm05 and gm04, respectively, match. While a set associated with device sn04 (data structure 120) does not have a matching set in data structure 100. Thus, the media guidance application may recommend device sn04 to the first user. It should be noted that if the set associated with device sn04 contains other devices (not shown), the media guidance application may select a device to recommend to a user from the set.

In some embodiments, each set of devices that the is associated with the second user may have a corresponding set of devices that is associated with the first user. Thus, the media guidance application may not be able to recommend a device of a type that the first user doesn't have. In these instances, the media guidance application may recommend another device to the first user of a type that the first user already has, but may have a smaller number of those devices in comparison with the second user.

Specifically, the media guidance application may determine, based on a respective characteristic of each set in the first plurality of sets and the second plurality of sets, that each set in the second plurality of sets matches a set in the first plurality of sets. For example, the media guidance application may iterate through each set in the first plurality of sets and determined (in a manner similar to a manner described above) that each set in the first plurality of sets matches a set in the second plurality of sets. To slightly change the example above related to FIG. 1, the media guidance application may determine that devices gm04 and sn04 have a level of similarity that is above the threshold level of similarity. Thus, those devices may be placed in one set.

The media guidance application may, in response to the determining, select a first set of the first plurality of sets of devices, and determine a second set of the second plurality of sets of devices, where the associated characteristic of the first set matches the associated characteristic of the second set. The media guidance application may compute a first number of devices in the first set and a second number of devices in the second set, and, in response to determining that the number of devices in the second set exceeds the number of devices in the first set, recommend, to the first user, a device matching a characteristic associated with the second set.

For example, the media guidance application may compute for each set a number of devices associated with each set. To continue with the example depicted in FIG. 1, the media guidance application may compute that each set has one device except for a set including device gm04 and device sn04, which has two devices. The media guidance application may recommend to the first user one of those devices as the first user has neither device gm04 nor sn04.

In some embodiments, the media guidance application when selecting the first set of devices, may determine a number of devices in each set of devices in the first plurality of sets of devices, and select, based on the determining, a set of devices that includes a smallest number of devices. For example, the media guidance application may start with a set of devices that has the smallest number of devices so that the media guidance application may recommend a device of a type of which the user has the least.

In some embodiments, the media guidance application may compare the device attributes associated with each device entry in the first plurality of device entries with the corresponding device attributes associated with each other device entry in the first plurality of device entries by performing the following actions. The media guidance application may select a first device in the first plurality of devices and a second device in the first plurality of devices, and determine a first plurality of numerical attributes associated with the first device and a second plurality of numerical attributes associated with the second device, where each numerical attribute is one that can be numerically compared with another numerical attribute in order to determine which attribute is greater. For example, the media guidance application may iterate through each attribute and determine a type of attribute (e.g., numerical, alphanumerical, textual, or any other suitable type). The media guidance application may utilize a pre-created function to determine whether all parameters of the attribute are digits.

The media guidance application may compare each numerical attribute in the first plurality of numerical attributes with a corresponding attribute in the second plurality of numerical attributes to determine a plurality of differences between corresponding numerical attributes, and compare each of the plurality of differences with an attribute threshold to determine whether each difference exceeds the attribute threshold. For example, the media guidance application may iterate through each numerical attribute associated with the first device and locate a corresponding numerical attribute associated with the second device. For example, the media guidance application may retrieve from a data structure associated with attributes of a first device (e.g., data structure stored in field 112 for device ip05). The media guidance application may retrieve the corresponding attribute for device ln05 (FIG. 1). The media guidance application may compare the attributes to determine a difference between the values. The media guidance application may subtract one attribute values from the other and set as the difference the absolute value of the subtraction result.

The media guidance application may determine, based on comparing each of the plurality of differences with the attribute threshold, a plurality of matching attributes with corresponding differences in the plurality of differences that do not exceed the attribute threshold, and store the plurality of matching attributes. For example, the media guidance application may retrieve (e.g., from storage 408) the attribute threshold. The attribute threshold may be supplied by an entity that maintains the media guidance application, an advertiser, or another suitable entity. The threshold may be a percentage difference or another suitable value. The media guidance application may compare the difference with the threshold to determine whether the difference exceeds the attribute threshold. The media guidance application may perform these actions for each attribute in order to determine which attributes match and which do not match. The media guidance application may store the plurality of matching attributes. For example, the media guidance application may store a pointer to each attribute that matches and create an array (or another suitable data structure) for all the pointers.

In some embodiments, the media guidance application may determine the respective level of similarity between each device in the first plurality of devices by performing the following actions. The media guidance application may retrieve, for the plurality of matching attributes, a weight associated with each attribute in the plurality of attributes, and compute a weighted sum of a number of attributes in the plurality of matching attributes.

For example, each attribute may be weighted differently based on is the importance of the attribute. Some attributes may be more important (e.g., storage size, random access memory size, process peed, and other suitable attributes) while other attributes may be less important such as process name, random access memory manufacturer, and other suitable attributes. An entity that is maintaining the media guidance application, an advertiser, or another entity may set a weight for each attribute. It should be noted that different advertisers may set different weights. The media guidance application may retrieve a weight for each matching attribute. The media guidance application may multiply each attribute by the weight and sum the results in order to compute the weighted sum.

The media guidance application may assign the weighted sum as the level of similarity between the first device and the second device. In another example, the memory size attribute may not be weighted as highly as the screen size attribute because screen size may be a much better differentiator of devices than memory size.

In some embodiments, the media guidance application may generate the first plurality of sets of devices by performing the following actions. The media guidance application may select a first device and a second device in the first plurality of devices with a corresponding level of similarity that exceed the threshold level of similarity, and generate a first set of devices including the first device and the second device. For example, the media guidance application when iterating through the devices associated with the first user, select two devices and retrieve a level of similarity associated with the two devices. If the level of similarity exceeds the threshold level of similarity, based on a calculation describe above, the media guidance application may generate a set that includes the two devices.

The media guidance application may select a third device in the first plurality of devices, and determine whether the level of similarity between both (1) the first device and the third device, and (2) the second device and the third device, respectively, exceeds the threshold level of similarity. The media guidance application may, in response to determining that the level of similarity between both (1) the first device and the third device, and (2) the second device and the third device, respectively does not exceed the threshold level of similarity, generate a second set of devices including the third device. The media guidance application may iterate through other devices and determine whether a level of similarity of another device associated with the first user exceeds the threshold level of similarity for both the first device and the second device.

In some embodiments, the media guidance application may recommend, to the first user, the device with the characteristic that is associated with the set of the second plurality of sets and is not associated with any set in the first plurality of sets by performing the following actions. The media guidance application may determine, based on device information associated with the user, that the user prefers to purchase devices at a discount rate. The media guidance application may determine that the user prefers to be devices at a discount rate based on sale attributes (e.g., sale attributes stored in fields 106 and 110). The media guidance application may make the determination in a manner similar to determining the preferred discount, described above.

The media guidance application may, in response to the determining, retrieve, from the database of device information, one or more device entries that match the characteristic, retrieve, for the one or more device entries, a corresponding price, and recommend, to the user, the device that is associated with a price that is smaller than any other price. For example, the media guidance application may retrieve (e.g., from a manufacturer's database) the current price associated with each retrieve entry. The media guidance application may compare the prices and recommend the smallest price.

In some embodiments, the media guidance application may determine, based on the device information associated with the user, that the user prefers to purchase devices at the discount rate by performing the following actions. The media guidance application may retrieve a purchase metric associated with the user, and determine, based on a preferred discount value associated with the purchase metric, that the user prefers to purchase devices at the discount rate. For example, the media guidance application may calculate the purchase metric using actions described above. The media guidance application my retrieve the preferred discount from the purchase metric and determine whether that number is greater than zero. If the number is greater than zero, the media guidance application may determine that the user prefers to purchase devices at a discount rate.

In some embodiments, the media guidance application may recommend, to the first user, the device with the characteristic that is associated with the set of the second plurality of sets and is not associated with any set in the first plurality of sets by performing the following actions. The media guidance application may determine, based on device information associated with the user, that the user prefers to delay purchasing devices after those devices are released. The media guidance application may, in response to the determining, retrieve, from the database of device information, one or more device entries that match the characteristic, retrieve, for the one or more device entries, a corresponding release date, and recommend, to the user, the device that is associated with a release date that is closest to a preferred delay. For example, the media guidance application may perform these actions in a manner similar to the actions described in relation to recommending the device based on a preferred discount, except the preferred discount parameter is replaced with a preferred delay parameter (e.g., price numbers are replaced by day numbers). Thus, if multiple devices with purchase metrics that exceed the purchase threshold metric are identified, the media guidance application may recommend the device that was released closest to the duration of the preferred delay.

In some embodiments, the media guidance application may determine, based on device information associated with the user, that the user prefers to purchase devices after a release date by performing the following actions. The media guidance application may retrieve a purchase metric associated with the user, and determine, based on a preferred delay value associated with the purchase metric, that the user prefers to wait to purchase devices after the release date, where the wait is based on the preferred delay. For example, the media guidance application may perform these actions in a manner similar to the actions described in relation to recommending the device based on a preferred discount, except the preferred discount parameter is replaced with a preferred delay parameter (e.g., price numbers are replaced by day numbers).

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
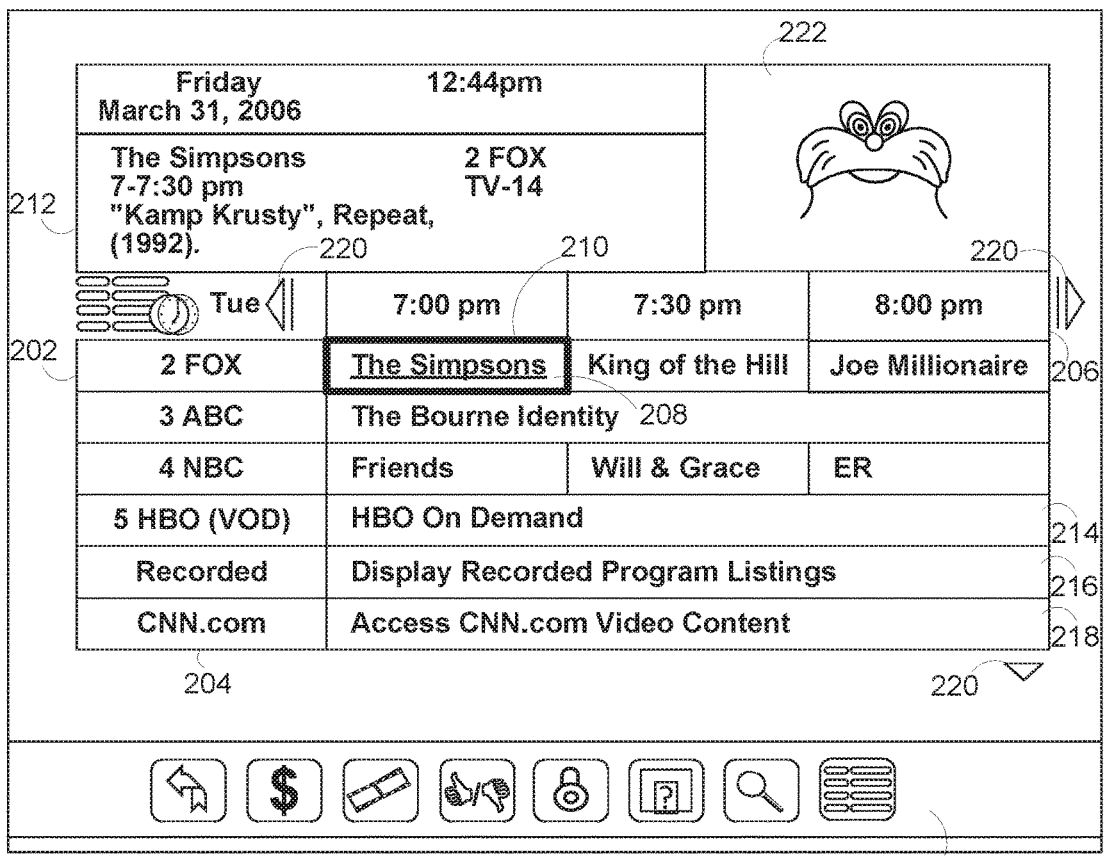
FIG. 2 shows an illustrative embodiment of a display screen that may be used to provide media guidance application listings and other media guidance information, in accordance with some embodiments of the disclosure.
Figure 3:
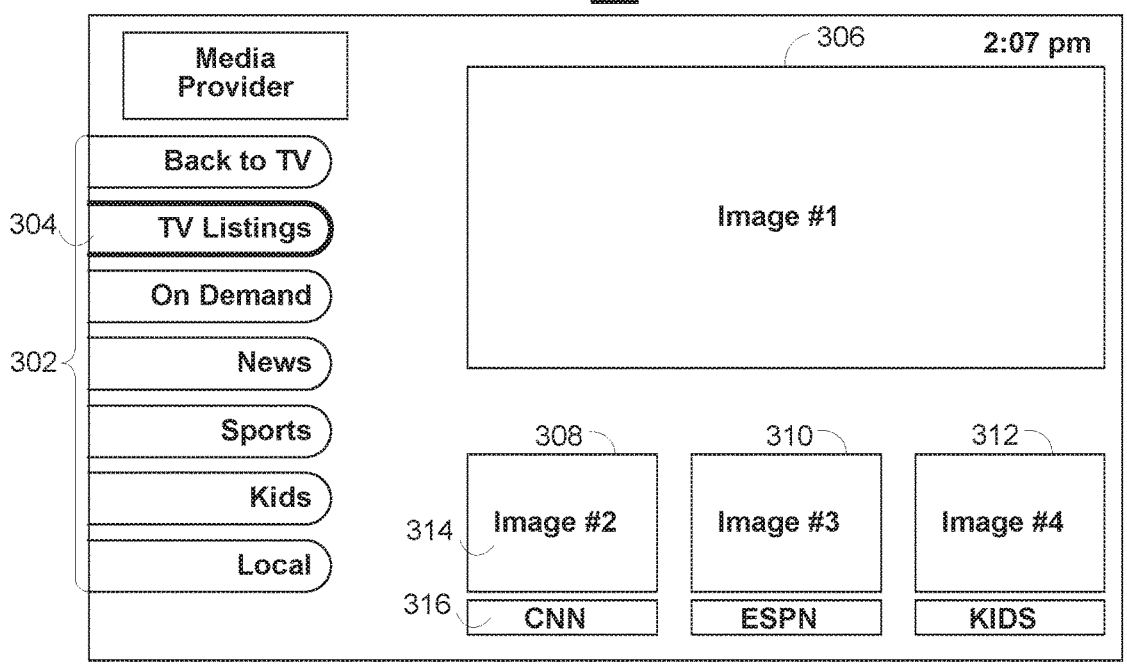
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
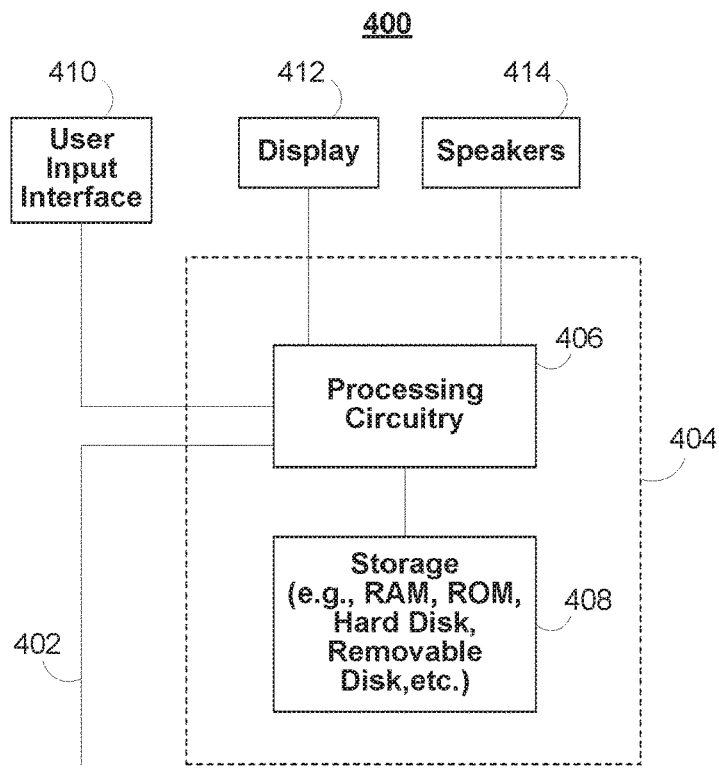
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
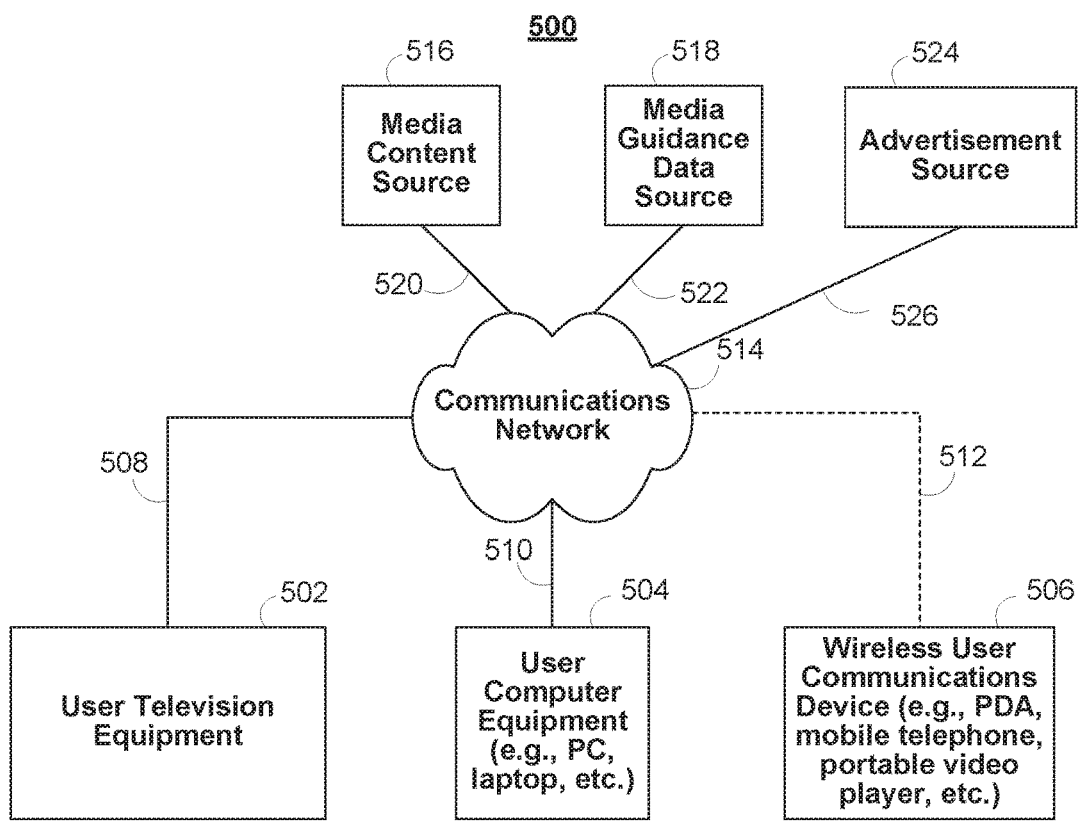
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
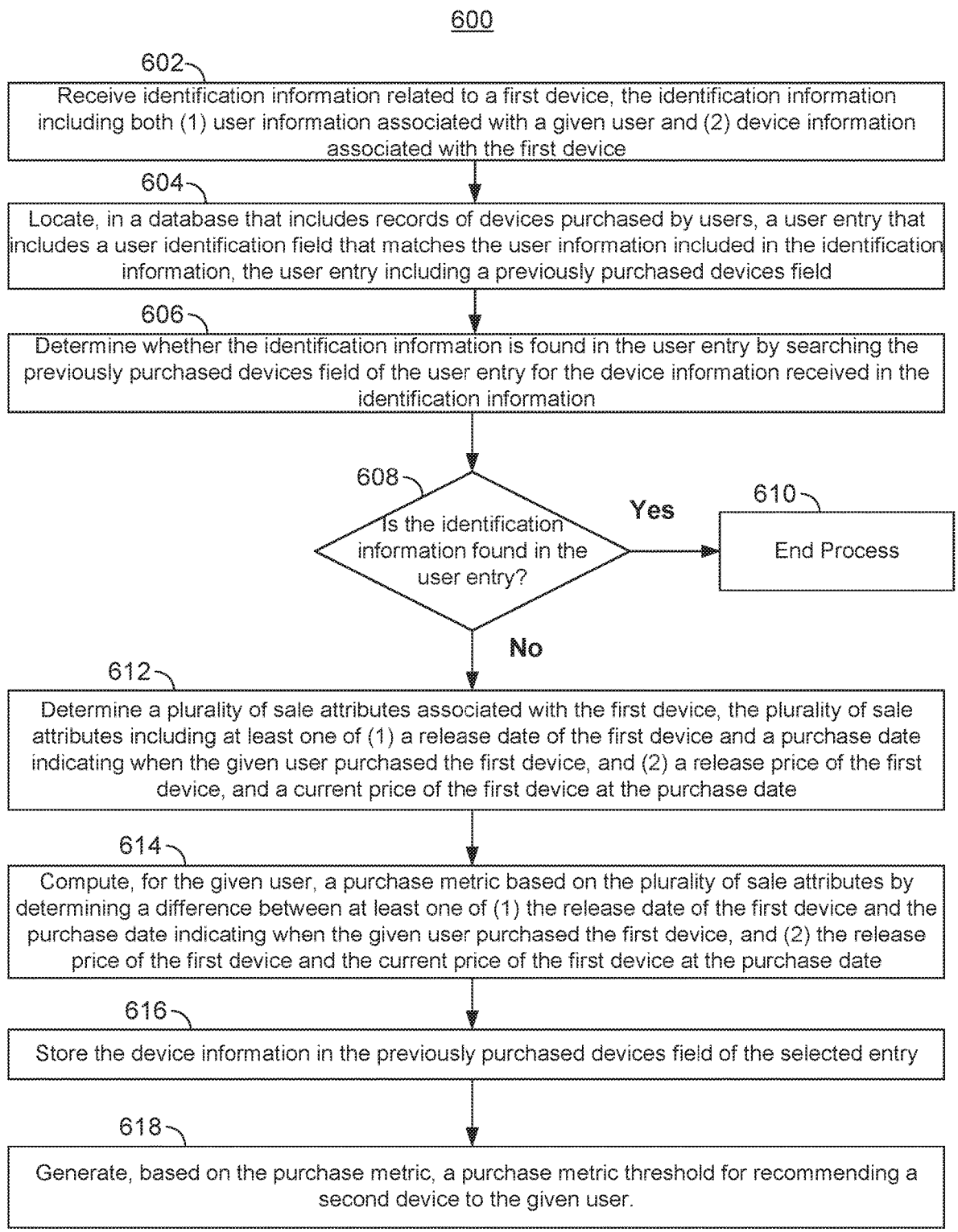
FIG. 6 is a flowchart of illustrative actions involved in generating metrics for recommending electronic devices to a user based on purchase data, in accordance with some embodiments of the disclosure.

FIG. 6 is a flowchart of illustrative actions involved in generating metrics for recommending electronic devices to a user based on purchase data. A media guidance application may be used to perform the actions described below in order to generate a purchase metric threshold. The media guidance application may be executed on control circuitry (e.g., control circuitry 404). In some embodiments, the media guidance application may be located on user equipment (e.g., user television equipment 502, user computer equipment 504, and/or wireless user communications device 506). In some embodiments, portions of the media guidance application may be located on user equipment (e.g., user television equipment 502, user computer equipment 504, and/or wireless user communications device 506) and some portions may be located on a remote server (e.g., a server associated with media content source 516 and/or media guidance data source 518). At 602, control circuitry 404 receives identification information related to a first device, the identification information including both (1) user information associated with a given user and (2) device information associated with the first device. For example, the control circuitry may receive the identification information through I/O path 402 from one or more databases. For example, a user may be accessing the media guidance application from a mobile device (e.g., device 504 or device 506). The user may access a media guidance application located on user television equipment 502 or at a server (e.g., media content source 516 or media guidance data source 518). It should be noted that, in some embodiments, the user may access some functions of the media guidance application on user television equipment 502 and some functions on a server (e.g., media content source 516 or media guidance data source 518).

In some embodiments, the media guidance application may use the user's supplied credentials to identify a user and query a database of user information (e.g., a database residing at media content source 516 and/or media guidance data source 518) for information associated with the user. The media guidance application may also query the user's device (e.g., user computer equipment 504 or wireless user communications device 506) for device identification. In some embodiments, the media guidance application may query a database of device information for device information. Control circuitry 404 may receive the identification information in any manner described in relation to FIG. 1.

At 604, control circuitry 404 locates, in a database that includes records of devices purchased by users, a user entry that includes a user identification field that matches the user information included in the identification information, the user entry including a previously purchased devices field. For example, the control circuitry may generate a query for a record based on an identifier associated with the given user and transmit that query to the database. The control circuitry may transmit the query (e.g., via I/O path 402 through communications network 514). The control circuitry may receive (e.g., through I/O path 402) the user entry in response to transmitting the query. Control circuitry 404 may locate the user entry in any manner described in relation to FIG. 1.

At 606, control circuitry 404 determines whether the identification information is found in the user entry by searching the previously purchased devices field of the user entry for the device information received in the identification information. For example, the control circuitry may retrieve (e.g., from storage 408, media content source 516 or media guidance data source 518) the user entry and iterate through each device identifier in the previously purchased devices field. The control circuitry may compare each device identifier with a device identifier of the first device. Control circuitry 404 may determine whether the identification is found in the user entry in any manner described in relation to FIG. 1.

At 608, if the identification information is found in the user entry field, a match is found, and process 600 moves to action 610, where process 600 ends, as the device is known, thus, it is not new to the system. If the identification information is not found in the user entry field, no match is found and process 600 moves to action 612.

At 612, control circuitry 404 determines a plurality of sale attributes associated with the first device, the plurality of sale attributes including at least one of (1) a release date of the first device and a purchase date indicating when the given user purchased the first device, and (2) a release price of the first device, and a current price of the first device at the purchase date. For example, the control circuitry may retrieve the attributes from a database. The database may reside in storage 408 on a user device (e.g., user television equipment 502, user computer equipment 504, or wireless user communications device 506) or on a remote server (e.g., a server associated with media content source 516 and/or media guidance data source 518). Control circuitry 404 may determine the plurality of sale attributes associated with the first device in any manner described in relation to FIG. 1.

At 614, control circuitry 404 computes, for the given user, a purchase metric based on the plurality of sale attributes by determining a difference between at least one of (1) the release date of the first device and the purchase date indicating when the given user purchased the first device, and (2) the release price of the first device and the current price of the first device at the purchase date. For example, the control circuitry may use a date compare function and/or subtract the release price from the purchase price. The control circuitry may store the computed purchase metric in storage 408 on a user device or on a remote server (e.g., media content source 516 and/or media guidance data source 518). Control circuitry 404 may perform the compute the purchase metric in any manner described in relation to FIG. 1.

At 616, control circuitry 404 stores the device information in the previously purchased devices field of the selected entry. For example, the control circuitry may store (e.g., in storage 408 of a one of user television equipment 502, user computer equipment 504, or wireless communications device 506) the device information in a data structure associated with the previously purchased devices field. The control circuitry may, additionally or alternatively, update a remote server (e.g., a server associated with media content source 516 and/or media guidance source 518) with the device information. Control circuitry 404 may store the device information in any manner described in relation to FIG. 1.

At 618, control circuitry 404 generates, based on the purchase metric, a purchase metric threshold for recommending a second device to the given user. The control circuitry may store the generated purchase metric in storage 408 of a user device or at a remote server (e.g., media content source 516 and/or media guidance data source 518). Control circuitry 404 may generate the purchase metric threshold in any manner described in relation to FIG. 1.

Figure 7:
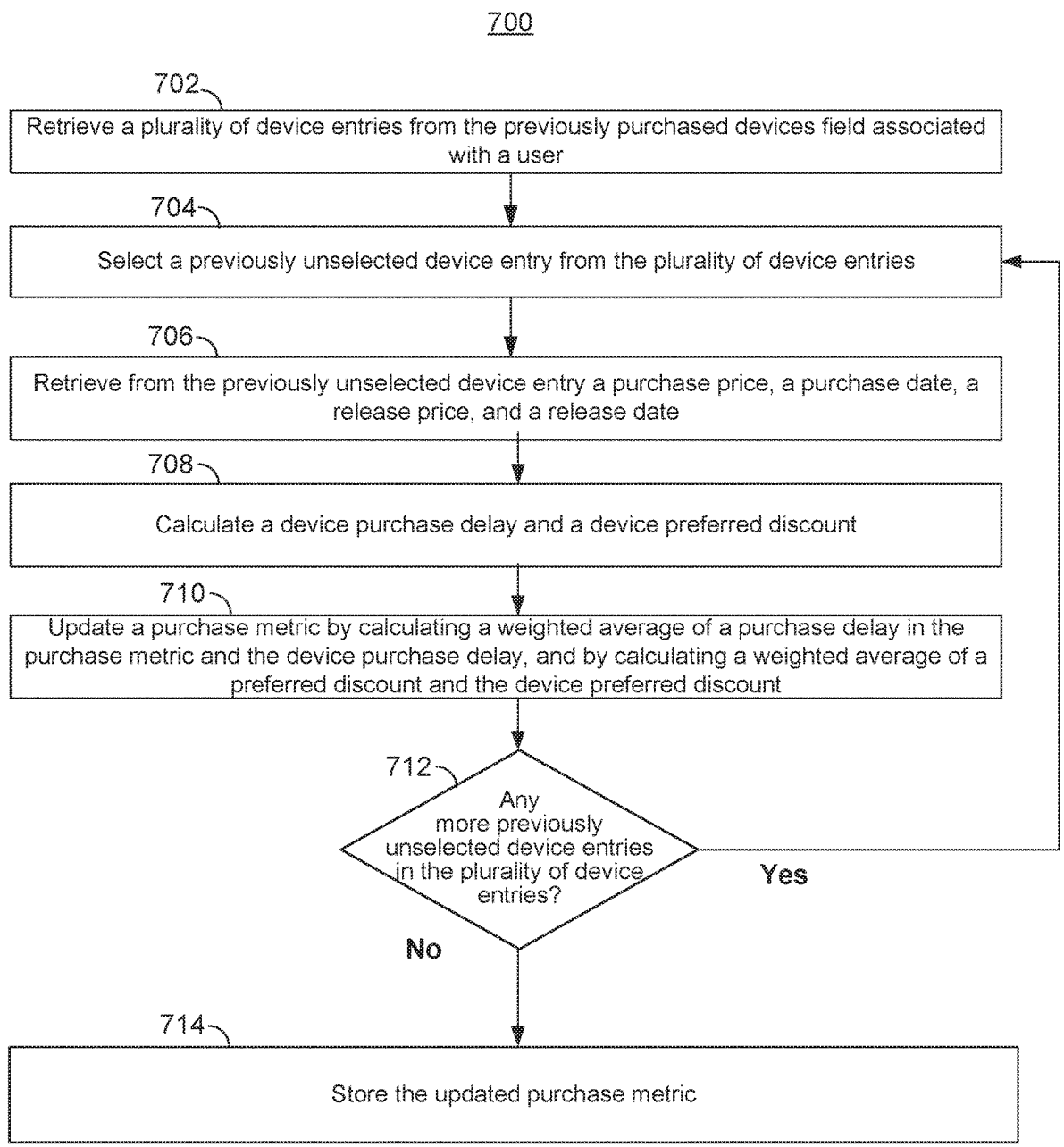
FIG. 7 is a flowchart of illustrative actions involved in updating a purchase metric based on purchase data associated with multiple devices, in accordance with some embodiments of the disclosure.

FIG. 7 is a flowchart of illustrative actions involved in updating a purchase metric based on purchase data associated with multiple devices. At 702, control circuitry 404 retrieves (e.g., from storage 408, media content source 516, or media guidance data source 518) a plurality of device entries from the previously purchased devices field associated with a user. The control circuitry may transmit a query to a database (e.g., a database located at media content source 516 and/or media guidance data source 518) for a user entry associated with the user. The user entry may include the previously purchased devices field. The control circuitry may store (e.g., in storage 408) the user entry in a data structure and extract from the data structure (e.g., via an API) the plurality of device identifiers from the previously purchased devices field. The control circuitry may generate one or more queries using the device identifiers. The control circuitry may transmit the one or more queries to a device database (e.g., a device database located at media content source 516 and/or media guidance data source 518) and receive device entries in response. Control circuitry 404 may store (e.g., in storage 408) the device entries in a data structure that can be iterated through.

At 704, control circuitry 404 selects a previously unselected device entry from the plurality of device entries. For example, the control circuitry may begin iterating through the data structure of device entries by selecting a first entry that hasn't been selected yet.

At 706, control circuitry 404 retrieves from the previously unselected device entry a purchase price, a purchase date, a release price, and a release date. The control circuitry may access the data structure (e.g., in storage 408 or at a remote server) and retrieve the needed information. The media guidance application may store the retrieved information in random access memory for easy access.

At 708, control circuitry 404 calculates a device purchase delay and a device preferred discount. Control circuitry 404 may make the calculation by executing a function that determines a difference between two days and another function that subtracts the purchase price of the device from the release price of the device. The control circuitry may execute the function using processing circuitry 406.

At 710, control circuitry 404 updates a purchase metric by calculating a weighted average of a purchase delay in the purchase metric and the device purchase delay, and by calculating a weighted average of a preferred discount and the preferred discount. The control circuitry may use processing circuitry 406 to perform the calculation. Control circuitry 404 may perform this calculation as described in relation to FIG. 1.

At 712, control circuitry 404 determines whether there are any more previously unselected device entries in the plurality of device entries. If there are more device entries to select, process 700 moves to action 704 and a new device entry is selected for processing. If no other device entries are left to select process 700 moves to action 714. At 714, control circuitry 404 stores the updated purchase metric. The control circuitry may store the updated purchase metric in storage 408 of one of (e.g., user television equipment 502, user computer equipment 504, or wireless user communications device 506) or at a remote server (e.g., a server associated with media content source 516 and/or media guidance data source 518).

Figure 8:
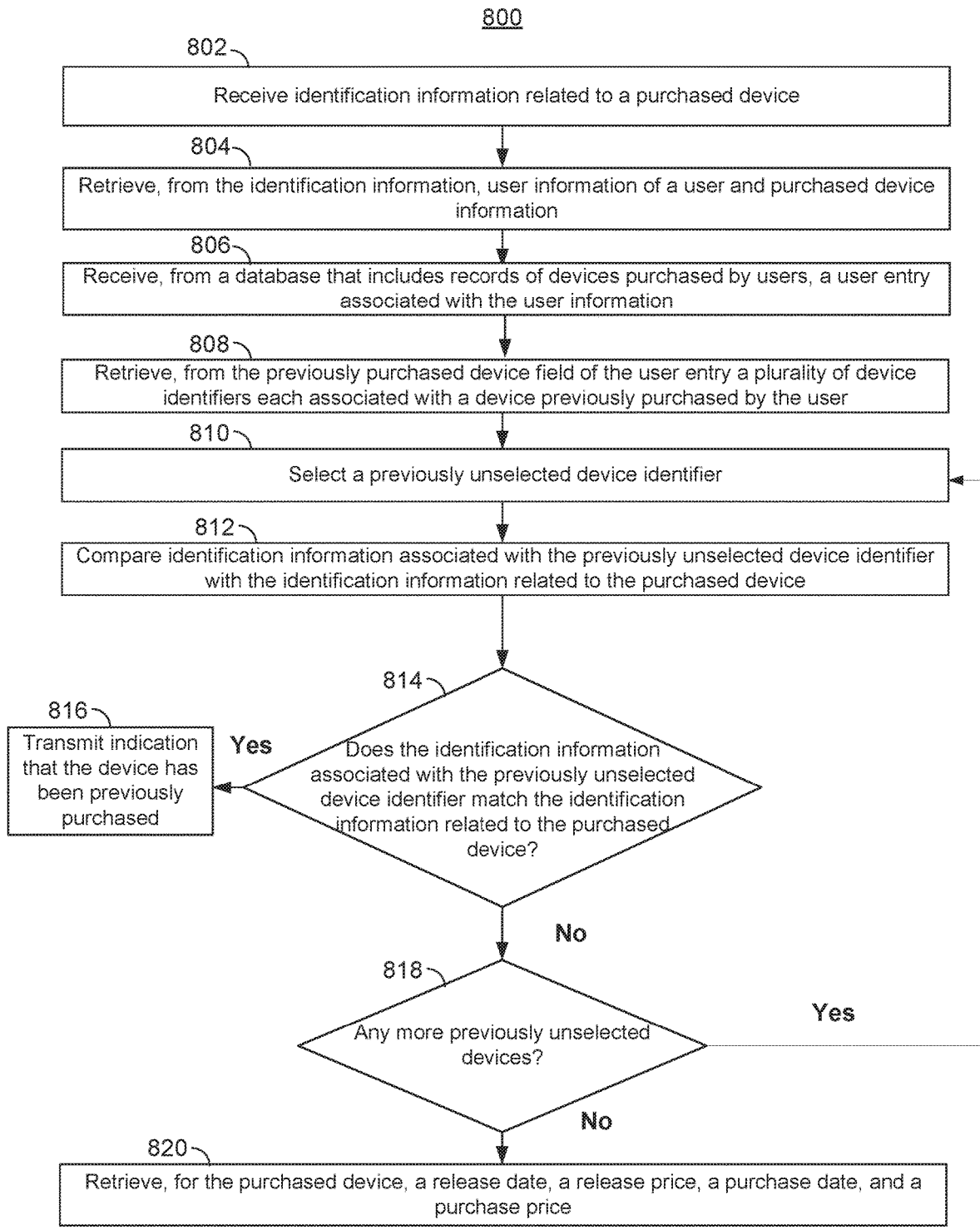
FIG. 8 is a flowchart of illustrative actions involved in determining whether the device being used by the user is a newly purchased device, in accordance with some embodiments of the disclosure.

FIG. 8 is a flowchart of illustrative actions involved in determining whether the device being used by the user is a newly-purchased device. At 802, control circuitry 404 receives identification information related to a purchased device. For example, a user device (e.g., user computer equipment 504 or wireless user communications device 506) may be communicating with the control circuitry (e.g., in order to retrieve some information related to the software that the control circuitry is executing). For example, the user device may be accessing a web page that is being presented by the control circuitry.

At 804, control circuitry 404 retrieves, from the identification information (e.g., that is stored in storage 408), user information of a user and purchased device information. For example, the control circuitry may retrieve a user ID associated with the user. At 806, control circuitry 404 receives, from a database that includes records of devices purchased by users, a user entry associated with the user information. The control circuitry may use the user ID to generate a query for the user entry. The control circuitry may transmit the query to the database and receive back the user entry associated with the user ID.

At 808, control circuitry 404 retrieves, from the previously purchased device field of the user entry a plurality of device identifiers each associated with a device previously purchased by the user. For example, the user entry that was received by the control circuitry may have been stored in a data structure. The control circuitry may access the previously purchased devices field in the data structure (e.g., a data structure located in storage 408, at media content source 516, or media guidance data source 518) and retrieve a device identifier associated with each device. At 810, control circuitry 404 selects a previously unselected device identifier. For example, the control circuitry may begin iterating through each device identifier by selecting the first one. It should be noted that the control circuitry may store a copy of the device identifiers in a data structure (e.g., an array) that may be iterated through.

At 812, control circuitry 404 compares identification information associated with the previously unselected device identifier with the identification information related to the purchased device. For example, the control circuitry may compare the device ID of the purchased device with a respective device ID associated with each device previously purchased by the user.

At 814, control circuitry 404 determines whether the identification information associated with the previously unselected device identifier matches the identification information related to the purchased device. If the control circuitry determines that the identification information associated with the previously unselected device identifier match the identification information related to the purchased device, process 800 moves to step 816, where the control circuitry transmits (e.g., via I/O path 402) an indication that the device has been previously purchased. If the control circuitry determines that the identification information associated with the previously unselected device identifier does not match the identification information related to the purchased device, process 800 moves to action 818.

At 818, control circuitry 404 determines whether there are any more previously unselected devices. If the control circuitry determines that there are more previously unselected devices, process 800 moves to action 810. If the control circuitry determines that there are no more previously unselected devices, process 800 moves to action 820. At 820, control circuitry 404 retrieves, for the purchased device, a release date, a release price, a purchase date, and a purchase price. For example, this data may be retrieved from storage 408 or from a remote server (e.g., a server associated with media content source 516 and/or media guidance data source 518).

Figure 9:
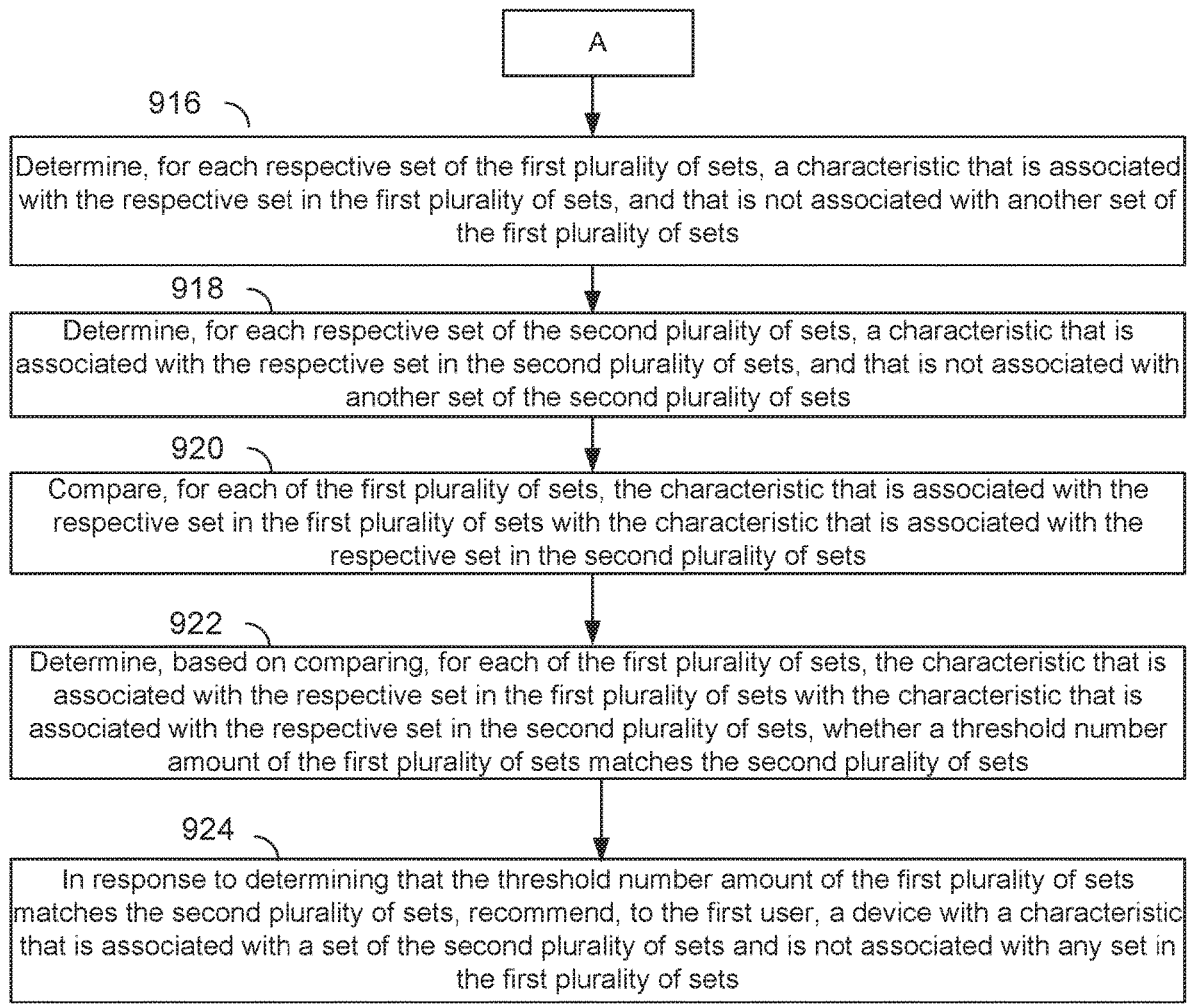
FIG. 9 is a flowchart of illustrative actions involved in recommending an electronic device based on a device profile, in accordance with some embodiments of the disclosure.

FIG. 9 is a flowchart of illustrative actions involved in recommending an electronic device based on a device profile, in accordance with some embodiments of the disclosure. At 902, control circuitry 404 retrieves, from a database (e.g., a database located in storage 408 of a user device, media content source 516 and/or media guidance data source 518) of device information, a first plurality of device entries that corresponds to a first plurality of devices that is associated with a first user, and a second plurality of device entries that corresponds to a second plurality of devices that is associated with a second user, where each device entry in the database of device information includes a plurality of device attributes associated with a corresponding device. The control circuitry may perform this action in any manner described in relation to FIG. 1.

At 904, control circuitry 404 compares device attributes associated with each device entry in the first plurality of device entries with corresponding device attributes associated with each other device entry in the first plurality of device entries. Control circuitry 404 may perform the comparison using process circuitry 406. The control circuitry may perform this action in any manner described in relation to FIG. 1.

At 906, control circuitry 404 determines, based on comparing the device attributes associated with each device entry in the first plurality of device entries with the corresponding device attributes associated with each other device entry in the first plurality of device entries, a first respective level of similarity between each device in the first plurality of devices, where each respective first level of similarity indicates how similar the attributes associated with each device in the first plurality of devices are to the attributes associated with each other device in the first plurality of devices. Control circuitry 404 may perform the comparison using process circuitry 406. The control circuitry may perform this action in any manner described in relation to FIG. 1.

At 908, control circuitry 404 generates a first plurality of sets of devices, where each set of devices in the first plurality of sets of devices includes one or more devices of the first plurality of devices with the respective first level of similarity between each device in each set of the first plurality that exceeds a threshold level of similarity. Control circuitry 404 may store the generated sets on a user device (e.g., user television equipment 502, user computer equipment 504, or wireless user communications device 506) or on a server (e.g., a server associated with media content source 516 and/or media guidance data source 518). The control circuitry may perform this action in any manner described in relation to FIG. 1.

At 910, control circuitry 404 compares device attributes associated with each device entry in the second plurality of device entries with corresponding device attributes associated with each other device entry in the second plurality of device entries. Control circuitry 404 may perform the comparison using processing circuitry 406. The control circuitry may perform this action in any manner described in relation to FIG. 1

At 912, control circuitry 404 determines, based on comparing the device attributes associated with each device entry in the second plurality of device entries with the corresponding device attributes associated with each other device entry in the second plurality of device entries, a second respective level of similarity between each device in the second plurality of devices, where each respective second level of similarity indicates how similar the attributes associated with each device in the second plurality of devices are to the attributes associated with each other device in the second plurality of devices. Control circuitry 404 may perform the determination using processing circuitry 406. The control circuitry may perform this action in any manner described in relation to FIG. 1.

At 914, control circuitry 404 generates a second plurality of sets of devices, where each set of devices in the second plurality of sets of devices includes one or more devices of the second plurality of devices with the respective second level of similarity between each device in each set of the second plurality that exceeds the threshold level of similarity. Control circuitry 404 may store the generated sets on a user device (e.g., user television equipment 502, user computer equipment 504, or wireless user communications device 506) or on a server (e.g., a server associated with media content source 516 and/or media guidance data source 518). The control circuitry may perform this action in any manner described in relation to FIG. 1.

At 916, control circuitry 404 determines, for each respective set of the first plurality of sets, a characteristic that is associated with the respective set in the first plurality of sets, and that is not associated with another set of the first plurality of sets. Control circuitry 404 may perform the determination using processing circuitry 406. The control circuitry may perform this action in any manner described in relation to FIG. 1.

At 918, control circuitry 404 determines, for each respective set of the second plurality of sets, a characteristic that is associated with the respective set in the second plurality of sets, and that is not associated with another set of the second plurality of sets. Control circuitry 404 may perform the determination using processing circuitry 406. The control circuitry may perform this action in any manner described in relation to FIG. 1.

At 920, control circuitry 404 compares, for each of the first plurality of sets, the characteristic that is associated with the respective set in the first plurality of sets with the characteristic that is associated with the respective set in the second plurality of sets. Control circuitry 404 may perform the comparison using processing circuitry 406. The control circuitry may perform this action in any manner described in relation to FIG. 1.

At 922, control circuitry 404 determines, based on comparing, for each of the first plurality of sets, the characteristic that is associated with the respective set in the first plurality of sets with the characteristic that is associated with the respective set in the second plurality of sets, whether a threshold number amount of the first plurality of sets matches the second plurality of sets. Control circuitry 404 may perform the determination using processing circuitry 406. The control circuitry may perform this action in any manner described in relation to FIG. 1.

At 924, control circuitry 404, in response to determining that the threshold number amount of the first plurality of sets matches the second plurality of sets, recommends, to the first user, a device with a characteristic that is associated with a set of the second plurality of sets and is not associated with any set in the first plurality of sets. For example, the control circuitry may generate for display (e.g., on display 412) the recommendation. The control circuitry may perform this action in any manner described in relation to FIG. 1.

Figure 10:
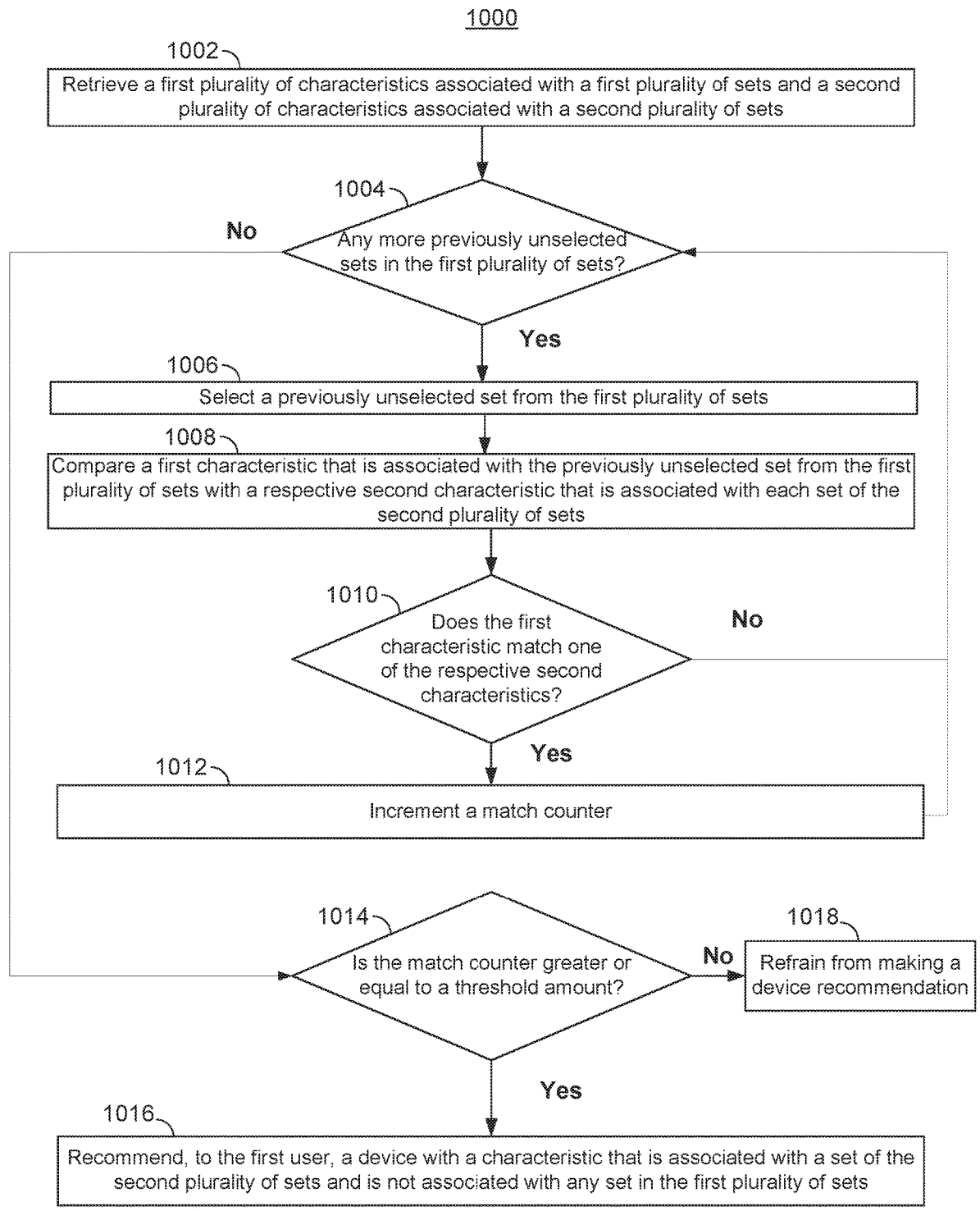
FIG. 10 is a flowchart of illustrative actions involved in recommending an electronic device to a user if the user's device profile is similar enough to another user's device profile, in accordance with some embodiments of the disclosure.

FIG. 10 is a flowchart of illustrative actions involved in recommending an electronic device to a user if the user's device profile is similar enough to another user's device profile. At 1002, control circuitry 404 retrieves (e.g., from storage 408, media content source 516, or media guidance data source 518) a first plurality of characteristics associated with a first plurality of sets and a second plurality of characteristics associated with a second plurality of sets. For example, the control circuitry may access metadata associated with each set and retrieve the corresponding characteristic. The metadata may be formatted and access via an API. In some embodiments, the metadata may be part of an XML file.

At 1004, control circuitry 404 determines whether there are any more previously unselected sets in the first plurality of sets. Control circuitry 404 may perform the determination using processing circuitry 406. If there are more previously unselected sets in the first plurality of sets process 1000 moves to action 1006, where control circuitry 404 selects a previously unselected set from the first plurality of sets. The control circuitry may retrieve the previously unselected set from a data structure stored in storage 408 or a database located at a remote server (e.g., a server associated with media content source 516 and/or media guidance data source 518).

At 1008, control circuitry 404 compares a first characteristic that is associated with the previously unselected set from the first plurality of sets with a respective second characteristic that is associated with each set of the second plurality of sets. Control circuitry 404 may perform the comparison using processing circuitry 406. For example, the control circuitry may make a textual comparison of the strings that make up each characteristic.

At 1010, control circuitry 404 determines whether the first characteristic matches one of the respective second characteristics. If the first characteristic matches one of the respective second characteristics, process 1000 moves to step 1012 where control circuitry 404 increments a match counter. The match counter indicates how many sets in the first plurality match a set in the second plurality. If the first characteristic does not match one of the respective second characteristics or after action 1012 has been performed, process 1000 moves to step 1004.

If, in step 1004, control circuitry 404 determines that there are no more previously unselected sets, process 1000 moves to action 1014. At 1014, control circuitry 404 determines whether the match counter greater or equal to a threshold amount. For example, the control circuitry may retrieve the threshold amount from storage. Control circuitry 404 may perform the determination using processing circuitry 406. If the match counter is not greater or equal to the threshold amount process, 1000 moves to action 1018, where control circuitry 404 refrains from making a device recommendation. If the match counter is greater or equal to the threshold amount process, 1000 moves to action 1016.

At 1016, control circuitry 404 recommends, to the first user, a device with a characteristic that is associated with a set of the second plurality of sets and is not associated with any set in the first plurality of sets. For example, the control circuitry may generate for display on display 412 (if the user's device has a display) an advertisement for an electronic device associated with the characteristic. In some embodiments, the control circuitry may create an email or a text message for recommending a device to the user. In yet some other embodiments, the control circuitry may alert manufacturers of electronic devices (e.g., by an electronic transmission through I/O path 402) that are associated with the characteristic that the user may be interested in such a device.

It is contemplated that the descriptions of FIGS. 6-10 may be used with any other embodiment of this disclosure. In addition, the descriptions described in relation to the processes of FIG. 6-10 may be done in alternative orders or in parallel to further the purposes of this disclosure. Furthermore, it should be noted that the processes of FIGS. 6-10 may be implemented on a combination of appropriately configured software and hardware, and that any of the devices or equipment discussed in relation to FIGS. 2-5 could be used to implement one or more portions of the process. Moreover, actions of any of processes 600, 700, and 800 may be used in conjunction with any step of any of processes 600, 700, 800, 900, and 1000. Steps of processes 600, 700, 800, 900 and/or 1000 may be omitted or replaced with any step of process 600, 700, 800, 900 and/or 1000.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for generating metrics for recommending electronic devices to a user based on purchase data, the method comprising:

receiving identification information related to a first device, the identification information including both (1) user information associated with a given user and (2) device information associated with the first device;

locating, in a database that includes records of devices purchased by users, an entry associated with the user that includes a user identification field that matches the user information included in the identification information, the entry associated with the user including a previously purchased devices field;

determining whether the identification information is found in the entry associated with the user by searching the previously purchased devices field of the entry associated with the user for the device information received in the identification information; and in response to determining that the identification information is not found in the entry associated with the user:

determining a plurality of sale attributes associated with the first device, the plurality of sale attributes including at least one of (1) a release date of the first device and a purchase date indicating when the given user purchased the first device, and (2) a release price of the first device, and a purchase price of the first device at the purchase date;

computing, for the given user, a purchase metric based on the plurality of sale attributes by determining a difference between at least one of (1) the release date of the first device and the purchase date indicating when the given user purchased the first device, and (2) the release price of the first device and the purchase price of the first device at the purchase date;

storing the device information in the previously purchased devices field of the entry associated with the user;

generating, based on the purchase metric, a purchase metric threshold for recommending a second device to the given user;

selecting a device to recommend to the user with a corresponding purchase metric that is higher than the purchase metric threshold and that is closest to the purchase metric threshold; and generating for display to the user a recommendation of the selected device, wherein the method further comprises:

generating a purchase metric record for the purchase metric, wherein the purchase metric record comprises a plurality of fields for the plurality of sale attributes;

storing the purchase metric together with the plurality of sale attributes in the plurality of fields of the purchase metric record, wherein each of the release date of the first device, the release price of the first device, the purchase date indicating when the given user purchased the first device, and the purchase price of the first device at the purchase date is assigned to a field of the plurality of fields;

retrieving data for a plurality of previously purchased devices from the previously purchased devices field;

determining, based on the data, for each device of the plurality of previously purchased devices, a corresponding plurality of sale attributes, wherein each corresponding plurality of sale attributes includes a release date of a corresponding previously purchased device, a release price of the corresponding previously purchased device, a corresponding purchase date indicating when the given user purchased the corresponding previously purchased device, and a purchase price of the corresponding previously purchased device at the corresponding purchase date;

storing, in the purchase metric record, each corresponding plurality of sale attributes;

updating, for the given user, the purchase metric based on each corresponding plurality of sale attributes; and updating, based on the updated purchase metric, the purchase metric threshold for recommending the second device to the given user.

2. The method of claim 1, wherein computing, for the given user, the purchase metric based on the plurality of sale attributes comprises:

comparing the purchase date of the first device with the release date of the first device;

determining, based on the comparing, an amount of purchase delay; and computing the purchase metric based on an amount of purchase delay.

3. The method of claim 1, wherein computing, for the given user, the purchase metric based on the plurality of sale attributes comprises:

comparing the release price of the first device with the purchase price of the first device;

determining, based on the comparing, a preferred discount; and computing the purchase metric based on the preferred discount.

4. The method of claim 1, wherein updating, for the given user, the purchase metric with each corresponding plurality of sale attributes comprises:

computing a plurality of purchase metrics for the plurality of previously purchased devices based on the plurality of sale attributes, respectively; and calculating a weighted average of the purchase metric and the plurality of purchase metrics.

5. The method of claim 4, wherein calculating the weighted average of the purchase metric and the plurality of purchase metrics comprises assigning a weight to each purchase metric in the plurality of purchase metrics based on a respective purchase date associated with each purchase metric in the plurality of purchase metrics.

6. The method of claim 1, wherein generating, based on the purchase metric, the purchase metric threshold comprises:

retrieving an amount of purchase delay, and a preferred discount, wherein the amount of purchase delay and the preferred discount are both associated with the purchase metric; and computing a weighted sum of the amount of purchase delay and the preferred discount.

7. The method of claim 1, wherein selecting a device to recommend to the user with a corresponding purchase metric that is higher than the purchase metric threshold and that is closest to the purchase metric threshold comprises:

locating, in the database that includes records of devices purchased by users, a plurality of devices released on a date that follows the purchase date;

computing a plurality of purchase metrics for each of the plurality of devices, wherein each purchase metric is based on a plurality of corresponding sale attributes that includes a current date, a current price of a corresponding device, a release date of the corresponding device, and a release price of the corresponding device; and comparing the purchase metric threshold with each of the plurality of purchase metrics; and based on the comparing, selecting a device to recommend to the user.

8. The method of claim 1, further comprising:

computing a plurality of purchase metrics for a plurality of devices, respectively, wherein each purchase metric is based on a plurality of respective sale attributes that includes a current date, a current price of a corresponding device, a release date of the corresponding device, and a release price of the corresponding device;

comparing the purchase metric threshold with each of the plurality of purchase metrics;

generating a set of devices with corresponding purchase metrics that are higher than the purchase metric threshold;

determining whether a device in the set of devices is a later version of a device in the previously purchased devices field; and in response to determining that the device in the set of devices is a later version of the device in the previously purchased devices field, recommending, to the given user, the device in the set of devices.

9. A system for generating metrics for recommending electronic devices to a user based on purchase data, the system comprising:
storage circuitry; and
control circuitry configured to:
receive identification information related to a first device, the identification information including both (1) user information associated with a given user and (2) device information associated with the first device;
locate, in a database that includes records of devices purchased by users, an entry associated with the user that includes a user identification field that matches the user information included in the identification information, the entry associated with the user including a previously purchased devices field;
determine whether the identification information is found in the entry associated with the user by searching the previously purchased devices field of the entry associated with the user for the device information received in the identification information; and
in response to determining that the identification information is not found in the entry associated with the user:
determine a plurality of sale attributes associated with the first device, the plurality of sale attributes including at least one of (1) a release date of the first device and a purchase date indicating when the given user purchased the first device, and (2) a release price of the first device, and a purchase price of the first device at the purchase date;
compute, for the given user, a purchase metric based on the plurality of sale attributes by determining a difference between at least one of (1) the release date of the first device and the purchase date indicating when the given user purchased the first device, and (2) the release price of the first device and the purchase price of the first device at the purchase date;
store, using the storage circuitry, the device information in the previously purchased devices field of the entry associated with the user;
generate, based on the purchase metric, a purchase metric threshold for recommending a second device to the given user;
select a device to recommend to the second user with a corresponding purchase metric that is higher than the purchase metric threshold and that is closest to the purchase metric threshold; and
generate for display to the user a recommendation of the selected device,
wherein the control circuitry is further configured to:
generate a purchase metric record for the purchase metric, wherein the purchase metric record comprises a plurality of fields for the plurality of sale attributes;
store, using the storage circuitry, the purchase metric together with the plurality of sale attributes in the plurality of fields of the purchase metric record, wherein each of the release date of the first device, the release price of the first device, the purchase date indicating when the given user purchased the first device, and the purchase price of the first device at the purchase date is assigned to a field of the plurality of fields;
retrieve data for a plurality of previously purchased devices from the previously purchased devices field;
determine, based on the data, for each device of the plurality of previously purchased devices, a corresponding plurality of sale attributes, wherein each corresponding plurality of sale attributes includes a release date of a corresponding previously purchased device, a release price of the corresponding previously purchased device, a corresponding purchase date indicating when the given user purchased the corresponding previously purchased device, and a purchase price of the corresponding previously purchased device at the corresponding purchase date;
store, using the storage circuitry in the purchase metric record, each corresponding plurality of sale attributes;
update, for the given user, the purchase metric based on each corresponding plurality of sale attributes; and
update, based on the updated purchase metric, the purchase metric threshold for recommending the second device to the given user.

10. The system of claim 9, wherein the control circuitry is configured, when computing, for the given user, the purchase metric based on the plurality of sale attributes, to:
compare the purchase date of the first device with the release date of the first device;
determine, based on the comparing, an amount of purchase delay; and
compute the purchase metric based on an amount of purchase delay.

11. The system of claim 9, wherein the control circuitry is configured, when computing, for the given user, the purchase metric based on the plurality of sale attributes to:
compare the release price of the first device with the purchase price of the first device;
determine, based on the comparing, a preferred discount; and
compute the purchase metric based on the preferred discount.

12. The system of claim 9, wherein the control circuitry is configured, when updating, for the given user, the purchase metric with each corresponding plurality of sale attributes, to:
compute a plurality of purchase metrics for the plurality of previously purchased devices based on the plurality of sale attributes, respectively; and
calculate a weighted average of the purchase metric and the plurality of purchase metrics.

13. The system of claim 12, wherein the control circuitry is configured, when calculating the weighted average of the purchase metric and the plurality of purchase metrics, to assign a weight to each purchase metric in the plurality of purchase metrics based on a respective purchase date associated with each purchase metric in the plurality of purchase metrics.

14. The system of claim 9, wherein the control circuitry is configured, when generating, based on the purchase metric, the purchase metric threshold, to:
retrieve an amount of purchase delay, and a preferred discount, wherein the amount of purchase delay and the preferred discount are both associated with the purchase metric; and
compute a weighted sum of the amount of purchase delay and the preferred discount.

15. The system of claim 9, wherein the control circuitry is configured to select a device to recommend to the second user with a corresponding purchase metric that is higher than the purchase metric threshold and that is closest to the purchase metric threshold by:

locating, in the database that includes records of devices purchased by users, a plurality of devices released on a date that follows the purchase date;

computing a plurality of purchase metrics for each of the plurality of devices, wherein each purchase metric is based on a plurality of corresponding sale attributes that includes a current date, a current price of a corresponding device, a release date of the corresponding device, and a release price of the corresponding device;

comparing the purchase metric threshold with each of the plurality of purchase metrics; and based on the comparing, selecting a device to recommend to the user.

16. The system of claim 9, wherein the control circuitry is further configured to:

compute a plurality of purchase metrics for a plurality of devices, respectively, wherein each purchase metric is based on a plurality of respective sale attributes that includes a current date, a current price of a corresponding device, a release date of the corresponding device, and a release price of the corresponding device;

compare the purchase metric threshold with each of the plurality of purchase metrics;

generate a set of devices with corresponding purchase metrics that are higher than the purchase metric threshold;

determine whether a device in the set of devices is a later version of a device in the previously purchased devices field; and in response to determining that the device in the set of devices is a later version of the device in the previously purchased devices field, recommend, to the given user, the device in the set of devices.

* * * * *

UNITED STATES PATENT AND TRADEMARK OFFICE
CERTIFICATE OF CORRECTION

PATENT NO. : 10,776,824 B2
APPLICATION NO. : 15/397526
DATED : September 15, 2020
INVENTOR(S) : Kevin Bruce Lenhart et al.

Page 1 of 1

It is certified that error appears in the above-identified patent and that said Letters Patent is hereby corrected as shown below:

In the Claims

Claim 7, Column 54, Line 46, please delete "and"

Signed and Sealed this
Tenth Day of November, 2020

Andrei Iancu
*Director of the United States Patent and Trademark Office*